(12) United States Patent
Crothers et al.

(10) Patent No.: US 12,257,695 B2
(45) Date of Patent: Mar. 25, 2025

(54) PICK-AND-PLACE MANUFACTURING SYSTEM AND METHOD

(71) Applicant: The Boeing Company, Chicago, IL (US)

(72) Inventors: Phillip John Crothers, Hampton East (AU); Martin Alexander Szarski, Brighton East (AU)

(73) Assignee: The Boeing Company, Arlington, VA (US)

( * ) Notice: Subject to any disclaimer, the term of this patent is extended or adjusted under 35 U.S.C. 154(b) by 304 days.

(21) Appl. No.: 18/046,936

(22) Filed: Oct. 16, 2022

(65) Prior Publication Data

US 2024/0123631 A1  Apr. 18, 2024

(51) Int. Cl.
  *B23Q 3/00* (2006.01)
  *B25J 5/04* (2006.01)
  *B25J 15/00* (2006.01)
  *B25J 15/06* (2006.01)

(52) U.S. Cl.
  CPC ............ *B25J 15/0608* (2013.01); *B25J 5/04* (2013.01)

(58) Field of Classification Search
  CPC .... B23Q 3/00; B23Q 3/04; B23Q 3/06; B25B 11/00; B25J 15/0019; B25J 15/0061; B25J 15/0246
  See application file for complete search history.

(56) References Cited

U.S. PATENT DOCUMENTS 5,364,083 A * 11/1994 Ross ................... B25B 11/005
                                                                269/21
10,928,226 B2   2/2021 Crothers
2016/0052148 A1* 2/2016 Shi .................... B25J 15/009
                                                                29/559
2020/0180116 A1* 6/2020 Combs .................. F16B 2/04
2020/0365305 A1  11/2020 Jochum
2024/0123631 A1* 4/2024 Crothers ............... B29C 70/38
2024/0269848 A1* 8/2024 Osunkwo .............. B25J 9/1661

FOREIGN PATENT DOCUMENTS

DE     102010052597     5/2012
DE     102015107394     11/2016

OTHER PUBLICATIONS

EPA, Extended European Search Report, appl. No. 23202903.3 dated Oct. 3, 2024.
Beckhoff Automation, "Beckhoff Brochure," retrieved on Aug. 2, 2022; available at <https://www.beckhoff.com/media/downloads/information-media/beckhoff_xplanar_e.pdf>.
Beckhoff Automation, "Beckhoff Instructions," retrieved on Sep. 10, 2022; available at <hhttps://download.beckhoff.com/download/document/motion/xplanar_ba_en.pdf>.

* cited by examiner

*Primary Examiner* — Lee D Wilson

(57) ABSTRACT

A manufacturing system includes a stator base, a plurality of movers, one or more end effectors, and a controller. The stator base has a planar stator surface covering an array of electrical coils configured to generate an electromagnetic field. The movers each contain multiple permanent magnets configured to cause the movers to levitate and move relative to the stator surface in response to the electromagnetic field. The end effectors are coupled to the movers, and each end effector perform one or more functions in relation to a material sheet. The controller activates the electrical coils in a manner causing independent, coordinated movement of the movers over the stator surface, and causing the end effectors to engage with and operate on the material sheet.

20 Claims, 29 Drawing Sheets

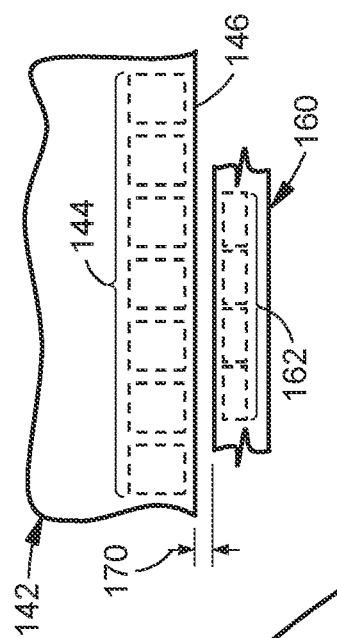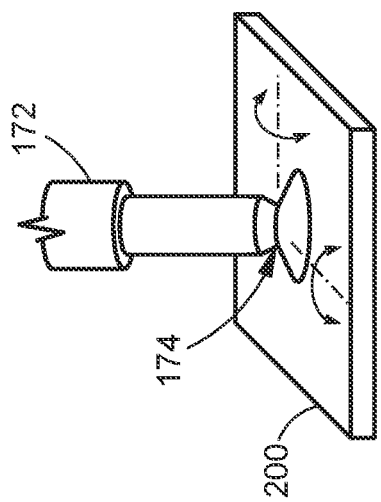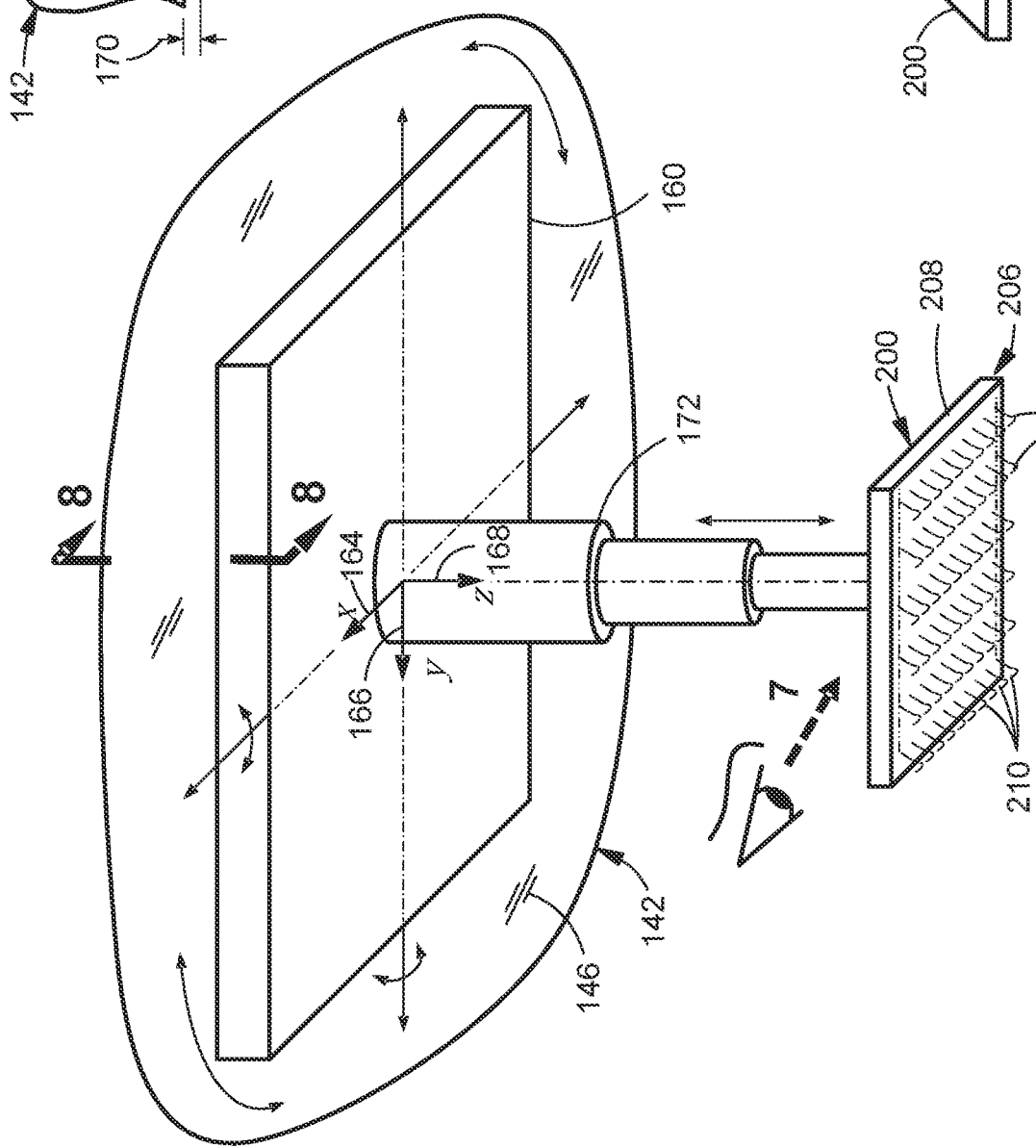

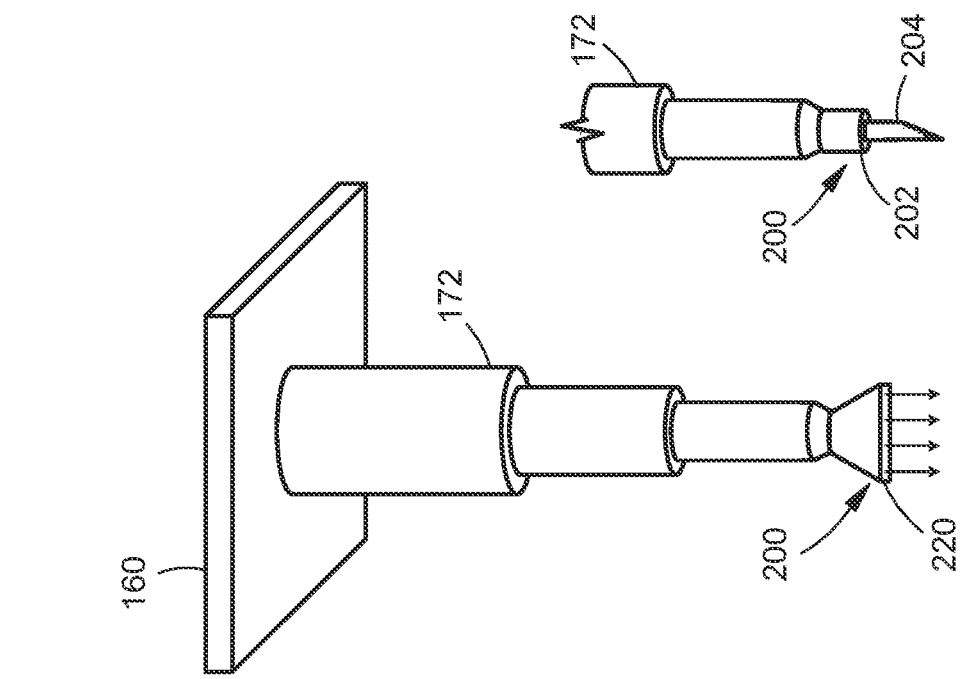
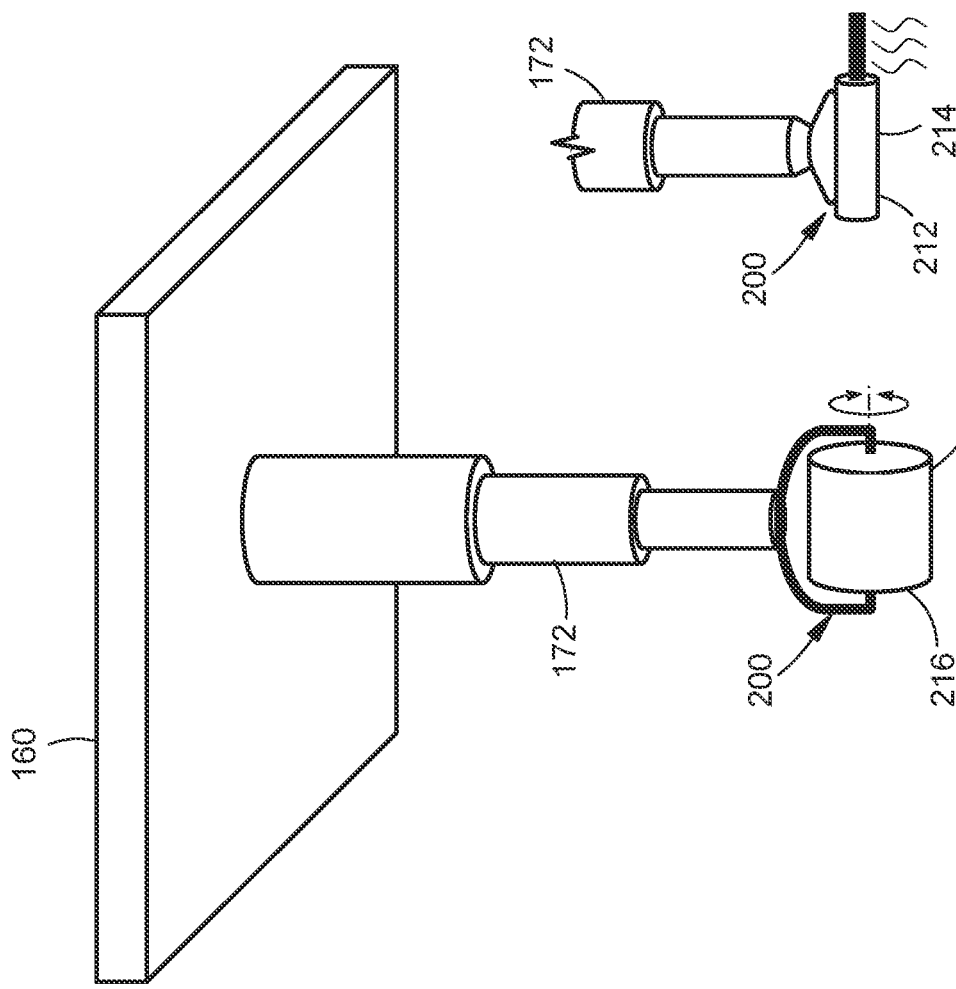

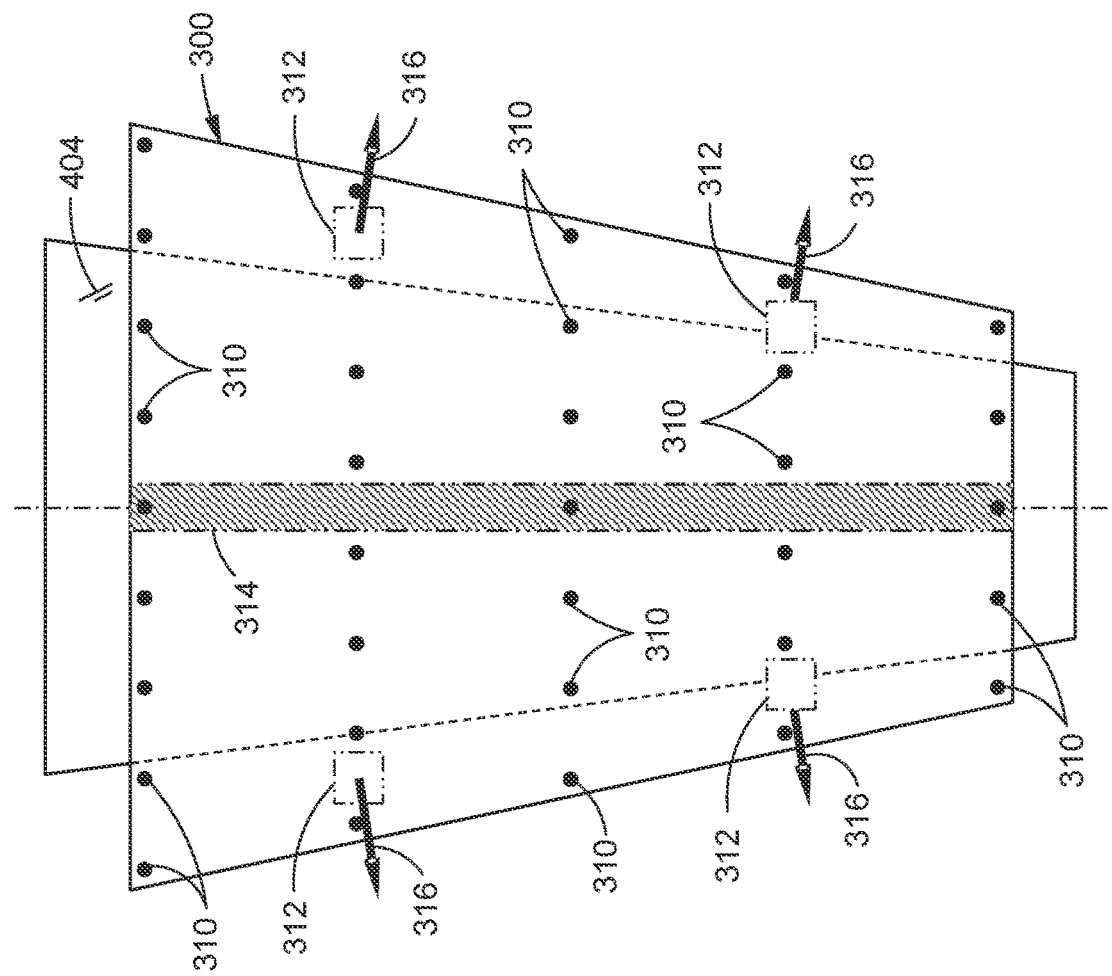

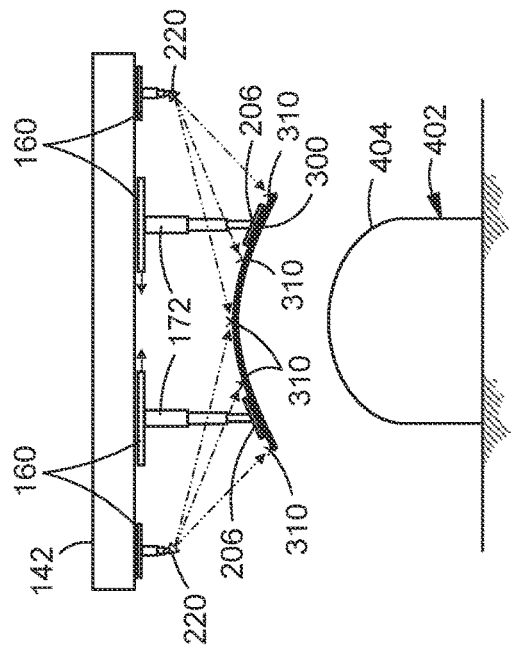
FIG. 30
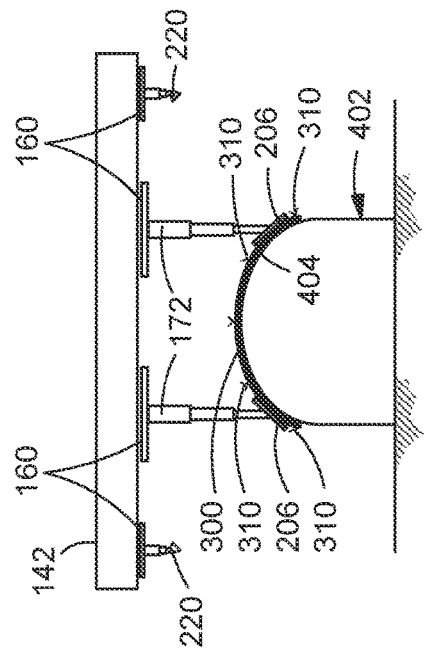
FIG. 31
FIG. 32
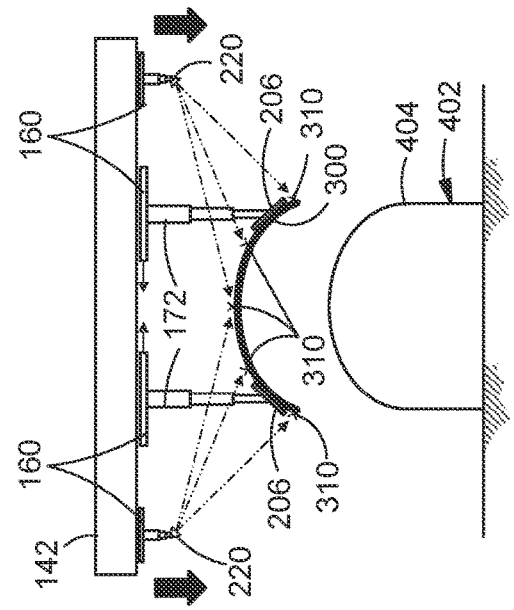
FIG. 33

PICK-AND-PLACE MANUFACTURING SYSTEM AND METHOD

FIELD

The present disclosure relates generally to manufacturing systems and, more particularly, to a pick-and-place manufacturing system comprised of levitated movers, each supporting an end effector, and movable over a stator surface in a coordinated manner to simultaneously engage and operate on a material sheet.

BACKGROUND

Composite materials are used in a wide variety of applications due to their favorable properties such as high specific strength, high specific stiffness, and high corrosion resistance. Composite materials in one example are comprised of fibrous material (e.g., carbon fibers) pre-impregnated with a resin (e.g., epoxy). Composite materials such as composite fabrics are generally produced in a flat or planar shape, and require secondary forming to produce functional end products. Several methods have developed for secondary forming of composite material.

One method of secondary forming is a manual operation in which one or more technicians pick up sheets or plies of composite material after being cut out of raw material using a ply cutter. The technicians manually transport each ply one-by-one from the ply cutter to a layup tool, where each ply is carefully positioned on the tooling surface of the layup tool. The technicians manually form each ply to the contours of the tooling surface. The forming process is largely unplanned, and is time-consuming and can result in wrinkles in the formed product due to manual handling of the plies.

Another method involves the use of automated lamination machines (ALMs), such as automatic fiber placement machines, contour tape laminating machines, or fabric dispensing machines, for automated application of unidirectional tape or fabric onto a layup tool. Such ALMs include mechanisms for conforming the composite material to the contours of a tooling surface. However, the shear strength of composite material and the bulkiness of the ALMs can limit the shapes of layup tools that composite materials can be successively formed over. In addition, the material deposition rates of ALMs generally decreases with increased complexity of the tooling surface.

Stamp and diaphragm forming are methods for single-plane forming of composite materials, or for small degrees of complex forming. The shear strength of composite materials can be a limiting factor in the complexity of shapes that can be formed using stamp or diaphragm forming. For example, material shear strength can limit the magnitude of force that can be applied to the composite material during the forming process. Complex shapes can be successively formed using stamp or diaphragm forming if the composite material is highly formable, which may come at the expense of material strength.

Other methods of forming composite materials are available. However, such methods can present challenges such as bridging or uncontrolled extension of the composite material in critical areas, and can potentially result in wrinkles and other undesirable features in the formed product. Although approaches have been developed to overcome the bridging problem, such approaches are limited in the shapes of layup tools over which composite material can be successfully formed.

As can be seen, there exists a need in the art for a system and method for automated forming of composite material into complex shapes in an accurate, wrinkle-free, and time-efficient manner.

SUMMARY

The above-noted needs associated with automated forming of composite materials are addressed by the present disclosure, which provides a manufacturing system comprising a stator base having a planar stator surface covering an array of electrical coils configured to generate an electromagnetic field. In addition, the manufacturing system includes a plurality of movers, each containing multiple permanent magnets configured to cause the movers to levitate and move relative to the stator surface in response to the electromagnetic field. The manufacturing system also includes one or more end effectors coupled to the movers. Each end effector is configured to perform one or more functions in relation to a material sheet. Additionally, the manufacturing system includes a controller configured to selectively activate the electrical coils in a manner causing independent, coordinated movement of the movers over the stator surface, and causing the end effectors to engage with and operate on the material sheet.

Also disclosed is a manufacturing system having a base transport system. In addition, the manufacturing system includes a stator base that is movably supported by the base transport system, and which has a planar stator surface covering an array of electrical coils configured to generate an electromagnetic field. Also, the manufacturing system includes a plurality of movers associated with the stator base. Each mover contains multiple permanent magnets configured to cause levitated movement of the mover relative to the stator surface in response to the electromagnetic field. Furthermore, the manufacturing system includes a plurality of end effectors coupled to the movers, and which are configured to perform one or more functions in relation to a material sheet. The manufacturer system additionally includes a controller configured to perform the following: selectively activate the electrical coils in a manner causing independent, coordinated movement of the movers over the stator surface, and causing the end effectors to engage with the material sheet at a material pickup station, and cause the base transport system to move the stator base through an envelope of motion to thereby transport the material sheet from the material pickup station to a material placement station.

Also disclosed is a method of processing a material sheet. The method includes activating an array of electrical coils in a stator base having a planar stator surface, and thereby generating an electromagnetic field. In addition, the method includes levitating and moving a plurality of movers in a coordinated manner over the stator surface in response to multiple permanent magnets in each mover reacting to the electromagnetic field. The method also includes performing one or more functions on a material sheet using a plurality of end effectors coupled to the movers.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or the claims.

FIG. 6 is a magnified view of the mover identified by reference numeral 6 of FIG. 4, and illustrating an end effector configured as a gripper for mechanically gripping a material sheet, and showing the end effector coupled to the mover via a telescopic post;

FIG. 7 is a perspective view of an example of a wrist joint coupling the end effector (e.g., gripper) to the telescopic post;

FIG. 8 is a sectional view of a portion of the planar motor system taken along line 8-8 of FIG. 6, and illustrating a mover in levitated relation to the stator surface of the stator base, and further illustrating an array of electromagnetic coils contained within the stator base, and an array of permanent magnets contained within the mover;

FIG. 9 shows an example of a mover supporting an end effector configured as a compaction device for compacting a material sheet against a tooling surface;

FIG. 10 shows an example of an end effector configured as a tacking device configured to spot fix a material sheet in position on a tooling surface;

FIG. 11 shows an example of an end effector configured as an inspection device for monitoring the pickup, placement, and forming of the material sheet on the tooling surface;

FIG. 12 shows an example of an end effector configured as a cutting device for cutting the material sheet;

FIG. 23 is a top-down view of the material sheet and layup tool taken along line 23-23 of FIG. 20, and illustrating the material sheet during an intermediate stage of forming over the tooling surface, and further illustrating a plurality of control points on the material sheet to enable tracking of the movement of the material sheet in response to tensile forces applied at the engagement points via the grippers;

FIG. 30 is a diagrammatic sectional view of the planar motor system containing a relatively large quantity of movers and grippers supporting the material sheet above the layup tool;

FIG. 31 is a diagrammatic sectional view of the planar motor system during forming of the material sheet while supported in three-dimensional space above the layup tool;

FIG. 32 is a diagrammatic sectional view of the planar motor system at completion of forming the material sheet into a shape complementary to the tooling surface while supported in three-dimensional space above the layup tool;

FIG. 33 is a diagrammatic sectional view of the planar motor system and material sheet after being lowered onto the tooling surface;

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed examples are shown. Indeed, several different examples or versions may be provided and should not be construed as limited to the examples set forth herein. Rather, these examples are provided so that this disclosure will be thorough and fully convey the scope of the disclosure to those skilled in the art.

This specification includes references to "some examples," "one example," or "an example." Instances of the phrases "some examples," "one example" or "an example" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently included.

As used herein, an element or step recited in the singular and preceded by the word "a" or "an" should be understood as not necessarily excluding the plural of the elements or steps.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 1:
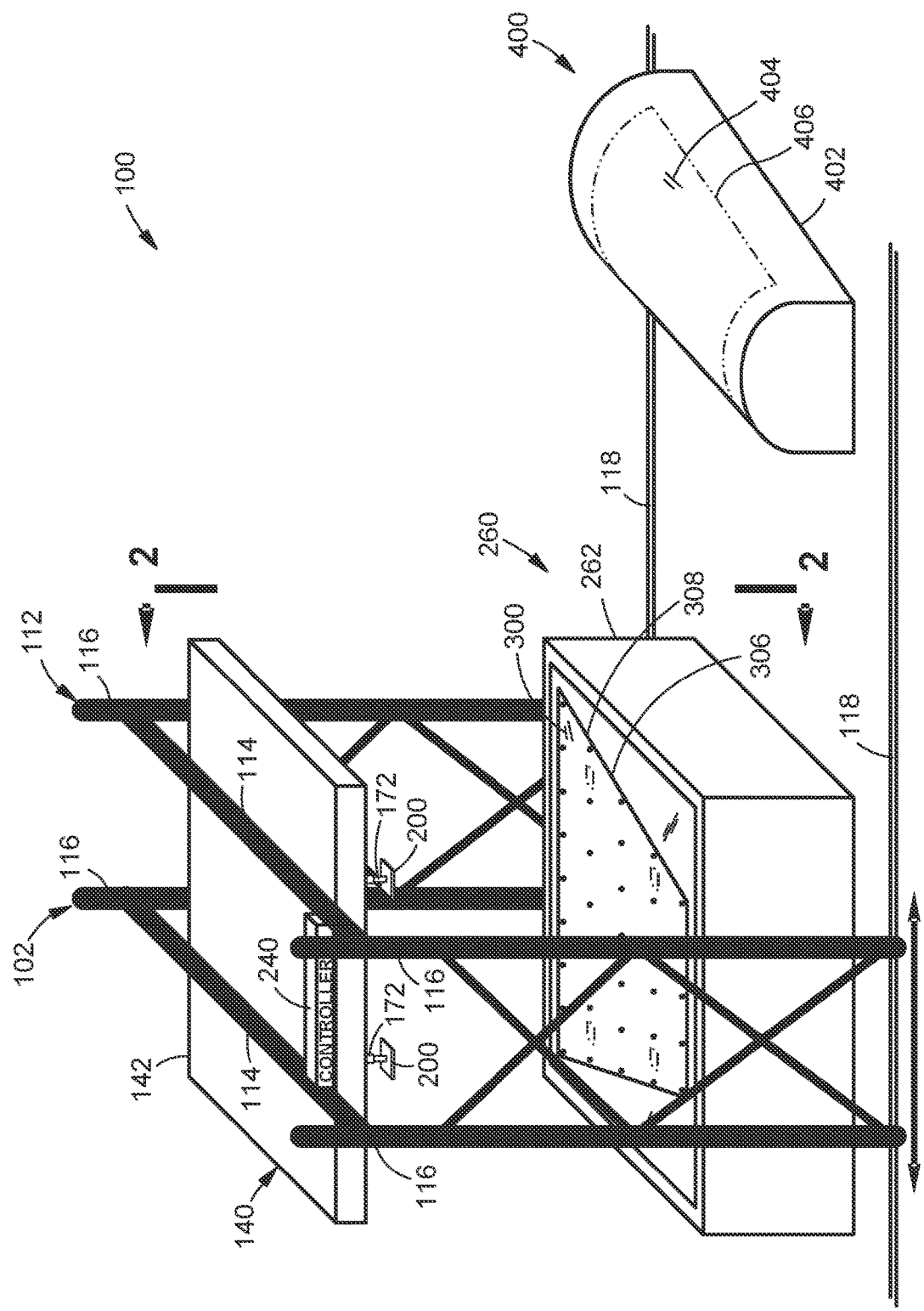
FIG. 1 is a perspective view of an example of a pick-and-place manufacturing system having a base transport mechanism configured as a gantry, and supporting a planar motor system over a material cutting table.
Figure 2:
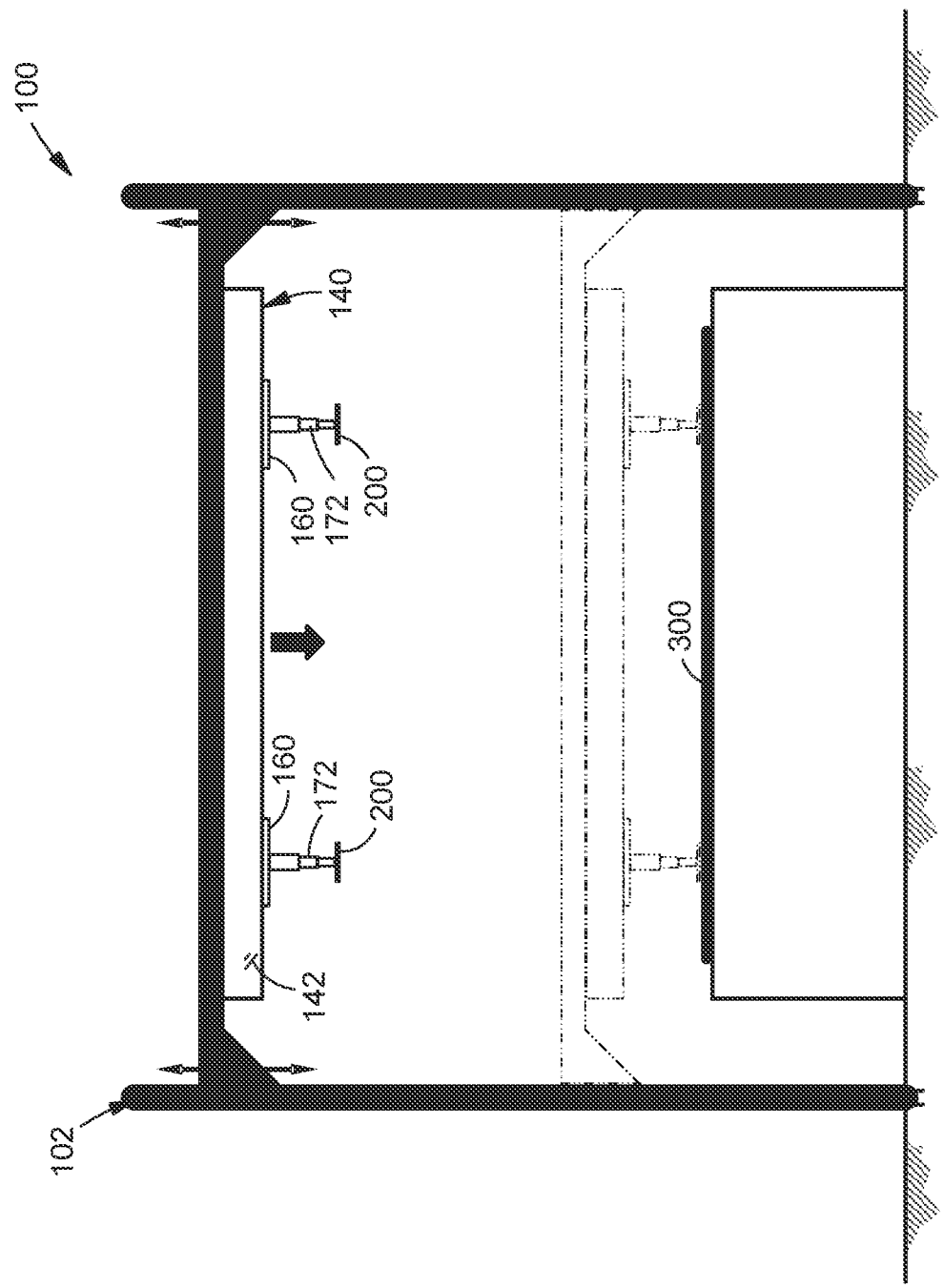
FIG. 2 is an end view of the manufacturing system taken along line 2-2 of FIG. 1.

Referring now to the drawings, shown in FIGS. 1-2 is an example of a manufacturing system 100 configured to perform pick and place operations on a material sheet 300. In the example shown, the manufacturing system 100 includes a base transport system 102, a planar motor system 140, and a controller 240. The planar motor system 140 includes a stator base 142, and one or more movers 160 (FIG. 2). The movers 160 are configured to move in levitated, non-contact relation to the stator base 142.

As shown in FIGS. 1-13 and described in greater detail below, the planar motor system 140 includes one or more end effectors 200 coupled to the movers 160. Each end effector 200 is configured to perform one or more functions in relation to a material sheet 300. For example, the end effectors 200 can be configured as grippers 206 (FIG. 4) configured to engage (e.g., grip) and pick up a material sheet 300 at a material pickup station 260 (e.g., FIG. 14), transport the material sheet 300 to a material placement station 400 via the base transport system 102 (e.g., FIGS. 15-17), and place the material sheet 300 onto a layup tool 402 at the material placement station 400 (e.g., FIG. 18), after which the grippers 206 disengage from the material sheet 300 (e.g., FIG. 19). For example, each gripper 206 can engage the material sheet 300 at a predefined engagement point 312 (FIG. 3) on the material sheet 300. The material sheet 300 includes a plurality of predefined control points 310 (FIG. 3) that enable tracking of the movement of the material sheet 300 during pickup, placement, and/or forming onto the tooling surface 404, as shown in FIGS. 20-27 and described in greater detail below.

In this regard, the planar motor system 140 provides a means for independent planar and out-of-plane movement of multiple end effectors 200 performing one or more functions in a coincident and/or sequential manner, as part of pick and place operations performed on a material sheet 300. For example, in addition to pick and place capability, the planar motor system 140 provides a means for measuring, compacting, tacking, and/or shearing of individual material sheets 300. The material sheets 300 can be composite plies, and the manufacturing system 100 can form each composite ply over a layup tool 402 as part of the process of laying up a composite laminate (not shown).

Referring to the example of FIGS. 1-2, the base transport system 102 is shown as an overhead gantry 112 configured to support and transport the planar motor system 140. The gantry 112 has a pair of overhead beams 114. The stator base 142 is fixedly coupled to the overhead beams 114. The overhead beams 114 are coupled at opposite ends to gantry posts 116. The overhead beams 114 are vertically movable along the gantry posts 116 for positioning the vertical height of the planar motor system 140. The gantry posts 116 are movable along gantry tracks 118, which may be embedded in the shop floor. The vertical movement of the overhead beams 114 and the horizontal movement of the gantry 112 is controlled by the controller 240.

As an alternative to a gantry 112, the base transport system 102 can be provided as one or more robotic devices 104 (FIGS. 34-40). As described in greater detail below, each robotic device 104 is configured to support and move one or more planar motor systems 140. However, the base transport system 102 is not limited to a gantry 112 or robotic devices 104, and can include any one of a variety of alternative base transport systems 102 for supporting and transporting the planar motor systems 140.

In FIGS. 1-33, the base transport system 102 is described in the context of transporting a single planar motor system 140 (and material sheet 300) between a material pickup station 260 containing a material cutting table 262, and a material placement station 400 containing a layup tool 402. However, the base transport system 102 may be configured to transport any number of planar motor systems 140 between any one of a variety of different locations within a manufacturing facility, and is not limited to movement between a material pickup station 260 and a material placement station 400.

Figure 3:
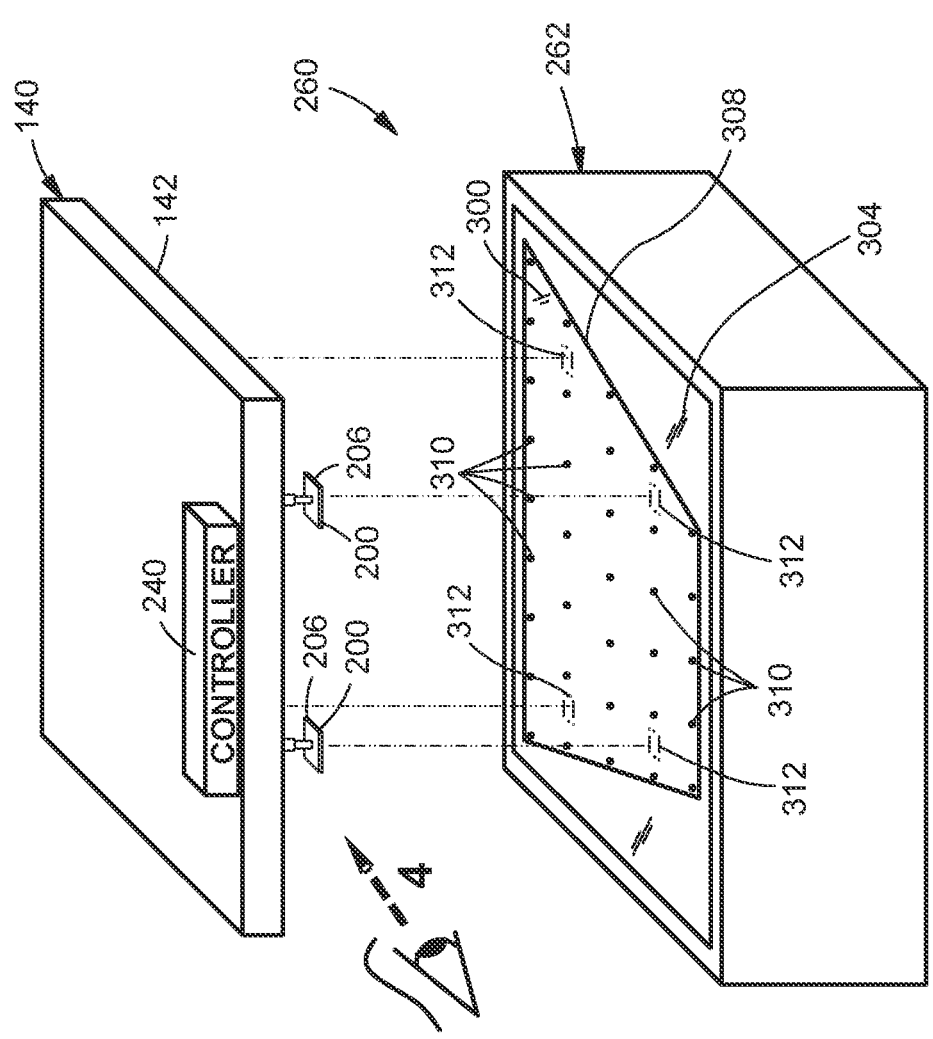
FIG. 3 is a top-down perspective view of the planar motor system taken along line 4 of FIG. 3, and showing the planar motor system positioned above a material sheet supported on the material cutting table.
Figure 4:
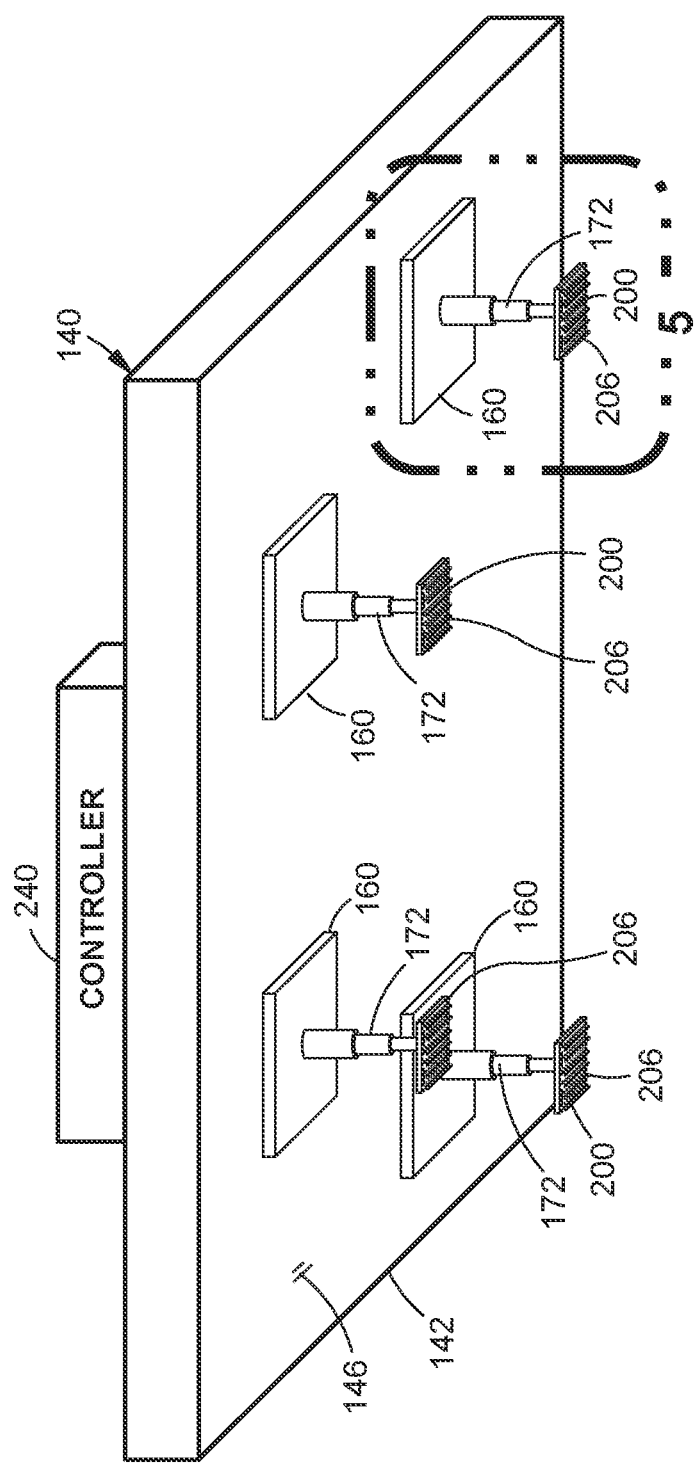
FIG. 4 is a bottom-up view of the planar motor system comprising a stator base, and a plurality of movers, each supporting an end effector.

Referring to FIGS. 1-8, the planar motor system 140 includes a stator base 142 and one or more movers 160, as mentioned above. FIG. 4 shows four movers 160 on the stator base 142, each supporting an end effector 200 configured as a gripper 206 for engaging or gripping a material sheet 300. In the example of FIG. 3, the material sheet 300 has four engagement points 312 for engagement respectively by the four grippers 206 (FIG. 4). Although FIG. 4 shows four movers 160 and four end effectors 200, a manufacturing system 100 can include any number of movers 160 and any number of end effectors 200.

The stator base 142 has a planar stator surface 146 covering an array of electrical coils 144, as shown in FIG. 8. The electrical coils 144 are arranged in an array (e.g., a Halbach array or other arrangement), and are configured to generate electromagnetic fields (not shown) when energized via command of the controller 240. Although the stator base 142 is shown having a square shape, the stator base 142 can have any one of a variety of different shapes including, but not limited to, rectangular, linear, triangular, disc shaped, or other shapes.

Referring to FIGS. 6-8, each of the movers 160 contains multiple permanent magnets 162 arranged in a horizontal plane, as shown in FIG. 8. The permanent magnets 162 cause the movers 160 to levitate and move in contact-free relation to the stator surface 146 in response to the electromagnetic fields generated by the electrical coils 144 when activated by the controller 240. Advantageously, the non-contact movement of the movers 160 over the stator surface 146 eliminates frictional energy losses and wear associated with conventional pick-and-place systems. Although shown in FIG. 6 as having a square shape, the mover 160 may be provided in any one of a variety of alternative shapes including, but not limited to, rectangular, triangular, disc shaped, or other shapes.

In FIG. 6, each mover 160 has a mover x-axis 164, a mover y-axis 166, and a mover z-axis 168. Each mover 160 is configured to move with at least two degrees-of-freedom, including planar motion parallel to the stator surface 146 within the plane of the mover x-axis 164 (e.g., left-right) and the mover y-axis 166 (e.g., forward-backward). The controller 240 is configured to precisely manipulate the electromagnetic fields in a manner to independently guide each mover 160 across the stator surface 146 along an infinite number of freely programmable mover paths (not shown). In one example, the movers 160 can be configured to travel at speeds of up to 2 meters-per-second or more. In addition, the movers 160 can be stopped at any location on the stator surface 146 with repeat positional accuracy on the order of tens of microns (e.g., less than 50 microns).

In addition to movement parallel to the stator surface 146, each mover 160 is configured to rotate 360 degrees in either direction about the mover z-axis 168. As shown in FIG. 8, the movers 160 are additionally configured to levitate at a controllable mover-stator gap 170 (e.g., up to 5 mm) relative to the stator surface 146. Additionally, the movers 160 can be configured for a small amount of tilting motion (e.g., up to 5 degrees) about the mover x-axis 164 and/or a small amount of tilting motion (e.g., up to 5 degrees) about the mover y-axis 166.

Figure 5:
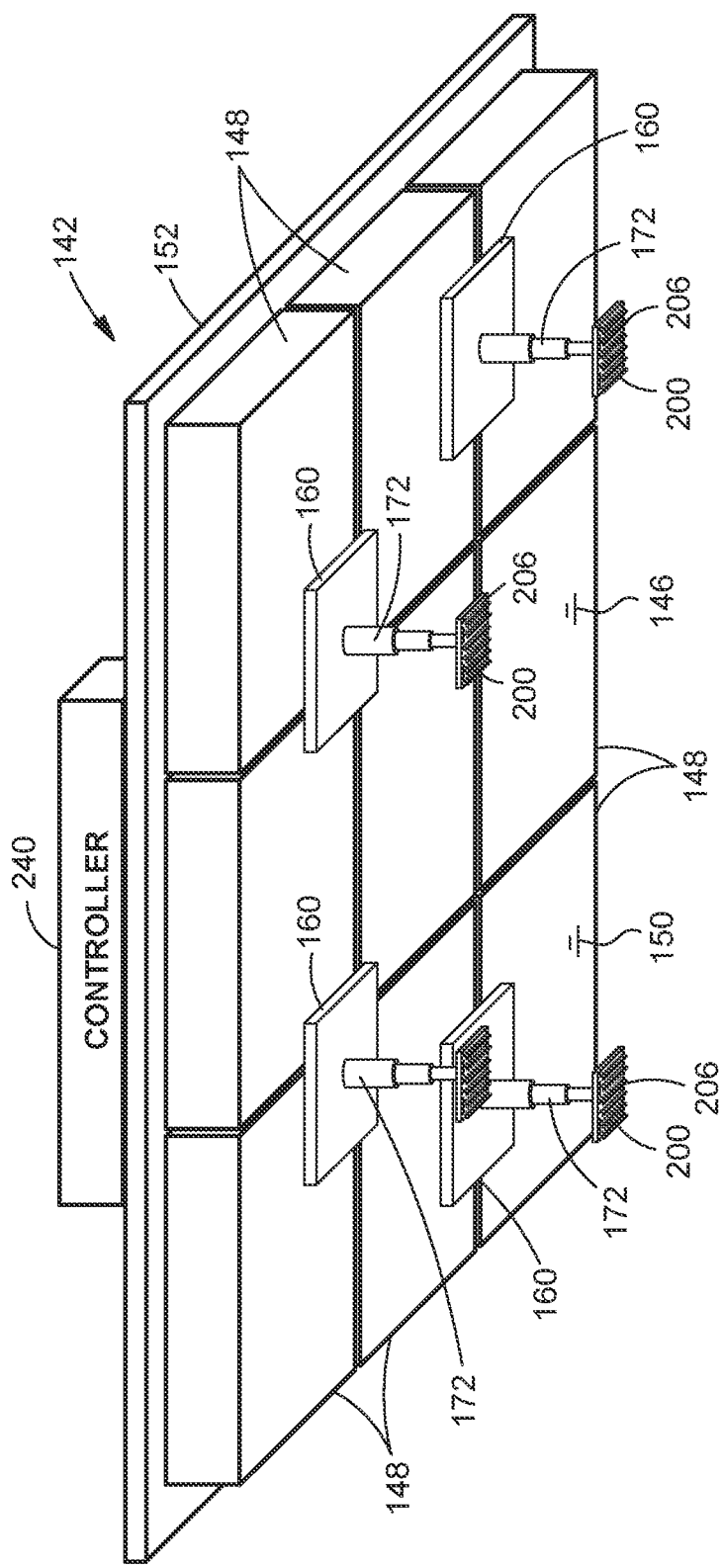
FIG. 5 is a bottom-up view of an example of the planar motor system in which the stator base is comprised of an array of side-by-side tiles.

Referring to FIG. 5, shown is an example of a stator base 142 comprised of multiple tiles 148 positioned in side-by-side relation to each other. The tiles 148 are mounted to a tile support frame 152, which is preferably a rigid structure fabricated of rigid material such as metallic material (e.g., aluminum), composite material (e.g., carbon fiber), or other material. The tile support frame 152 can be coupled to the base transport system 102 to allow the multi-tile stator base 142 to be moved during pick-and-place operations.

In FIG. 5, each tile 148 has a tile top surface 150, and contains an array of electrical coils 144 (FIG. 8). When assembled in side-by-side relation, the tiles 148 collectively form a stator base 142 having a planar stator surface 146. The tiles 148 are modular, allowing any number of tiles 148 to be positioned in side-by-side relation to form a stator surface 146 having any one of a variety of different shapes. Although FIG. 5 shows the tiles 148 arranged to form a stator base 142 having a square shape, the tiles 148 may be arranged to form a stator base 142 having a rectangular shape, a linear shape, or any other shape. One example of a planar motor system 140 that contains modular tiles 148 is the XPlanar motor system 140™, commercially available from Beckhoff Automation, of Savage, MN.

As shown in FIGS. 1-13, the manufacturing system 100 includes one or more end effectors 200 coupled to the movers 160. In the example shown, each mover 160 supports a single end effector 200. However in other examples not shown, a single mover 160 may support two or more end effectors 200. Each end effector 200 is supported on and mechanically coupled to a mover 160. FIGS. 1-7 and 9-12 illustrate each mover 160 having a telescopic post 172 coupling an end effector 200 to the mover 160. The telescopic post 172 is configured to extend and retract the end effector 200 in a direction perpendicular to the stator surface 146, along the mover z-axis 168 (FIG. 6).

Figure 13:
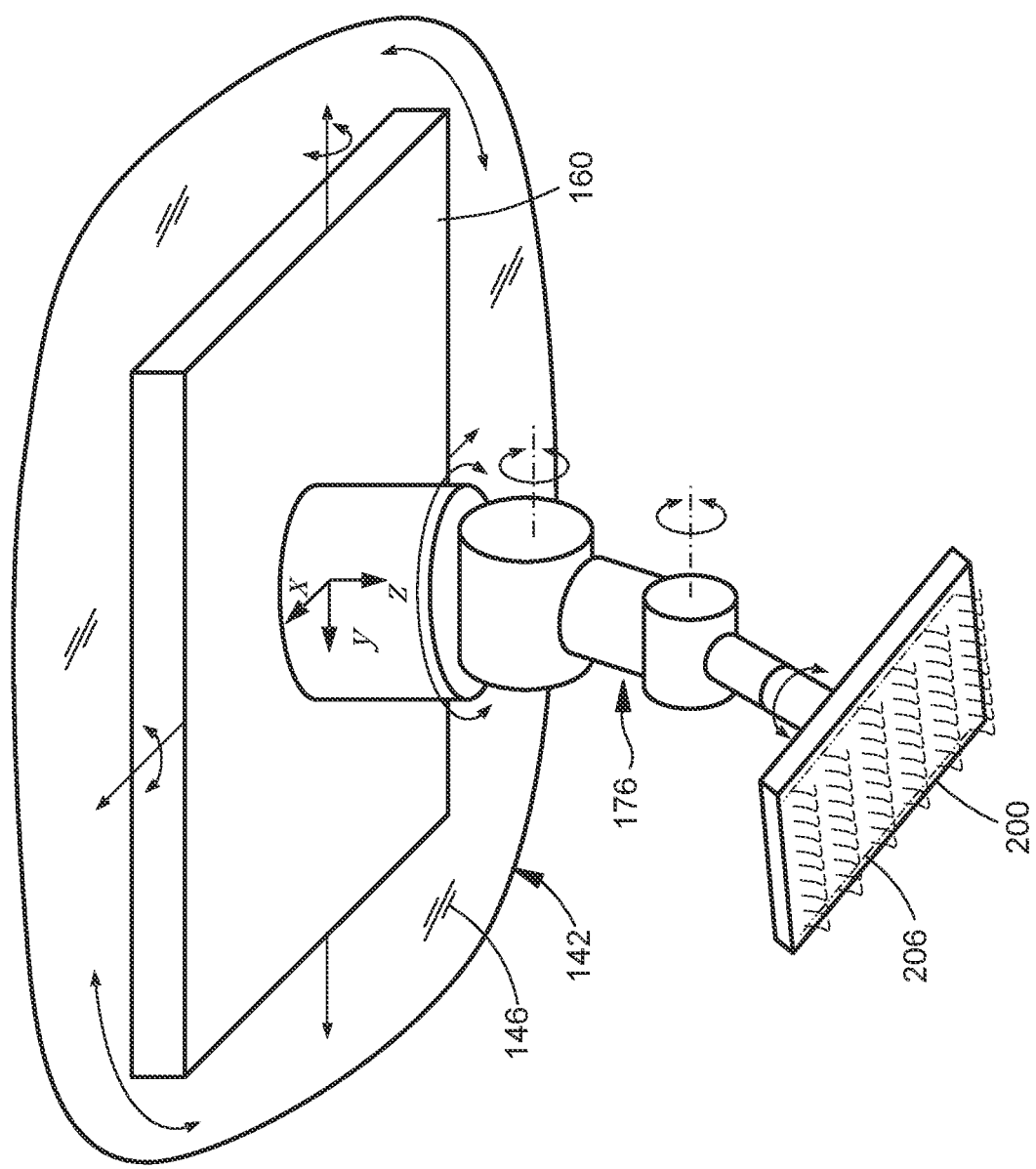
FIG. 13 shows an example of a mover having a multi-axis robot coupling the end effector to the mover.

Alternatively or additionally, each mover 160 may include a joint assembly to facilitate rotation of the end effector 200 in any number of directions. For example, FIG. 7 illustrates a wrist joint 174 coupling the end effector 200 to the telescopic post 172. The wrist joint 174 is configured to rotate an end effector 200 about at least two axes. In some examples, the wrist joint 174 can be configured as a universal joint, a ball-and-socket joint, or other joint configurations. In another example of a joint assembly, FIG. 13 shows a multi-axis robot arm 176 coupling the end effector 200 to the mover 160. The multi-axis robot arm 176 can include any number of arm segments 108 and arm joints 110 to facilitate orientation of the end effector 200 about any number of axes.

Referring to FIGS. 6 and 9-12, each end effector 200 is configured to perform one or more functions in relation to a material sheet 300, such as a composite ply of a composite laminate being laid up by the manufacturing system 100. FIG. 6 shows an example of an end effector 200 configured as a gripper 206 configured to engage with (i.e., grip) the material sheet 300, to allow for pickup of the material sheet 300, such as from a material pickup station 260 (FIG. 1). The gripper is 206 also configured to disengage from (i.e., release) the material sheet 300, after being applied to a tooling surface 404 of a layup tool 402 at a material placement station 400. In the example of FIGS. 6 and 9-12, the gripper 206 has a plurality of needles or hooks 210 protruding from a gripper plate 208 for mechanically engaging the material sheet 300. However, in other examples not shown, the gripper 206 may comprise a plurality of suction cups for vacuum engagement of a material sheet 300, or the gripper 206 may comprise an electrostatic device (not shown) for electrostatic engagement of a material sheet 300.

FIG. 9 shows an example of an end effector 200 configured as a compaction device 216. The compaction device 216 is configured to compact the material sheet 300 (FIG. 1)

against a tooling surface 404 (FIG. 1) or against a previously applied material sheet 300. In example shown, the compaction device 216 is a roller 218 configured to apply compaction pressure on a material sheet 300 during rolling application over a tooling surface 404. In other examples not shown, the compaction device 216 may be a compaction shoe configured to slide over a material sheet 300 while applying compaction pressure.

FIG. 10 shows an example of an end effector 200 configured as a tacking device 212. The tacking device 212 is configured to spot fix a material sheet 300 to a tooling surface 404 or to a previously applied material sheet 300. The spot fixing of the material sheet 300 prevents movement of the material sheet 300 during subsequent layup, compacting, and/or trimming. In the example shown, the tacking device 212 is a soldering iron 214 configured to tack a material sheet 300 in position via spot heating. However, the tacking device 212 may be provided in any one of a variety of other configurations for spot fixing a material sheet 300 in position.

FIG. 11 shows an example of an end effector 200 configured as an inspection device 220. The manufacturing system 100 can include one or more inspection devices 220 configured to actively monitor the pickup, placement, and/or forming of a material sheet 300 on a tooling surface 404. For example, the inspection devices 220 can facilitate the accurate positioning of the material sheet 300 on the tooling surface 404 such that the sheet edges 308 (FIG. 18) of the material sheet 300 align with edge locations 406 (FIG. 1) projected onto the tooling surface 404 using one or more laser projection devices (not shown) included with the manufacturing system 100. Feedback from the inspection devices 220 can facilitate adjustment of the controller software in a manner to improve the accuracy of the laydown of subsequently applied material sheets 300. The inspection device 220 can be a visible light camera, an infrared sensor, an eddy current sensor, a temperature sensor, and/or any one of a variety of other sensor configurations having the capability to actively measure, observe, and/or sense the pick up, placement, forming, trimming, and other operations that can be performed on a material sheet 300.

FIG. 12 shows an example of an end effector 200 configured as a cutting device 202. In the example shown, the cutting device 202 is a knife blade 204 configured to cut a material sheet 300, such as a composite ply. In this regard, in addition to grippers 206 for engaging a composite ply on a material cutting table 262, a planar motor system 140 can include one or more mover-mounted cutting devices 202 for cutting any uncut material (e.g., uncut fibers) detected by a mover-mounted inspection device 220 (e.g., a force sensor, a camera—not shown) during pickup of the composite ply off the material cutting table 262.

Figure 25:
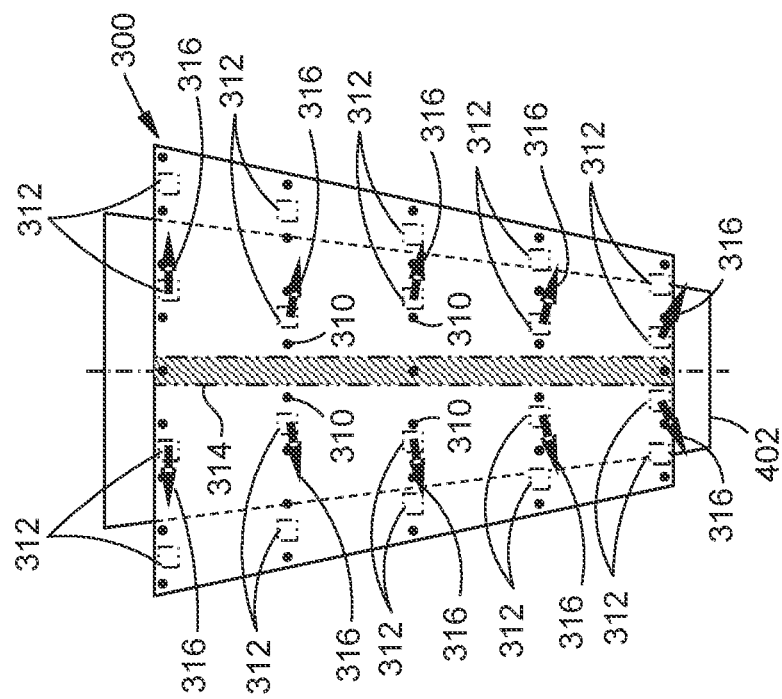
FIG. 25 is a top-down view of the material sheet taken along line 25-25 of FIG. 24, and illustrating the plurality of engagement points where the grippers engage the material sheet.

Referring still to FIGS. 6 and 9-12, the size (e.g., length and width) of each mover 160 may be dictated, at least in part, by the mass of the end effector 200, and/or by the function performed by the end effector 200. A mover 160 that supports an end effector 200 that is relatively heavy and/or which applies significant force to a material sheet 300 and/or to a layup tool 402 may be larger in size than a mover 160 that supports a lighter weight end effector 200, and/or an end effector 200 that applies a limited amount of force to a material sheet 300 or a layup tool 402. For example, a mover 160 supporting a gripper 206 (e.g., FIG. 9) may be larger in size than a mover 160 supporting an inspection device 220, a tacking device 212, or a cutting device 202, due to the requirement of the gripper 206 to support a portion of the mass of a material sheet 300 during pickup and placement, and the optional requirement of the gripper 206 to apply tensile force 316 to the material sheet 300 during forming over the tooling surface 404, as shown in FIGS. 23 and 25 and described below. Similarly, a mover 160 supporting a compaction device 216 may be relatively large in size due to the need for the compaction device 216 to apply compaction pressure on the material sheet 300 against the tooling surface 404 during the forming process. In contrast, a mover 160 supporting an inspection device 220 (e.g., FIG. 11), a tacking device 212, or a cutting device 202 may be relatively small in size, as neither the inspection device 220, the tacking device 212, or the cutting device 202 is required to apply a significant amount of force to the material sheet 300 or the layup tool 402.

As mentioned above, the manufacturing system 100 includes a controller 240 (e.g., FIGS. 1 and 3-5). The controller 240 is communicatively coupled to the stator base 142 and the end effectors 200. The controller 240 is configured to selectively activate the electrical coils 144 (FIG. 8) in a manner causing electromagnetic fields that levitate the movers 160 relative to the stator surface 146. In addition to levitating the moves, the electromagnetic fields prevent the movers 160 from moving perpendicularly away from the stator surface 146 beyond the above-mentioned mover-stator gap 170 (FIG. 8). Furthermore, the electromagnetic fields are manipulated in a manner to propel the movers 160 parallel to the stator surface 146 along any one of an infinite variety of preprogrammed mover paths (not shown). As mentioned above, the controller 240 is configured to generate electromagnetic fields that cause independent, coordinated movement of the movers 160 over the stator surface 146. In addition, the controller 240 commands the end effectors 200 to engage with and operate on the material sheet 300. The movement of the stator base 142 (via the base transport system 102), the movement of the movers 160, and/or the movement of the end effectors 200 can occur sequentially and/or simultaneously.

The planar motor system 140 is configured such that the movers 160 are levitated at the above-mentioned mover-stator gap 170 (FIG. 8) from the stator surface 146, regardless of the orientation of the stator surface 146. The movers 160 may be maintained at the mover-stator gap 170, regardless of whether the stator surface 146 is horizontally oriented (i.e., facing downward or upward), or the stator surface 146 is non-horizontally oriented. In the example of FIGS. 1-33, the stator base 142 is fixedly coupled to the gantry 112, and is maintained in a horizontal orientation with the stator surface 146 facing down. The electromagnetic fields are such that the movers 160 are maintained at a fixed mover-stator gap 170 below the stator surface 146.

Additionally, although not shown, the base transport system 102 can orient the stator base 142 such that the stator surface 146 faces up, and the electromagnetic fields are such that the movers 160 are maintained at the mover-stator gap 170 relative to the stator surface 146. In still other examples, the base transport system 102 can orient a stator base 142 non-horizontally (e.g., facing sideways), and the electromagnetic fields are such that the movers 160 are maintained at a fixed mover-stator gap 170 relative to the stator surface 146. The base transport system 102 can reorient the stator base 142 such that the stator surface 146 faces in different directions (e.g., upward, downward, sideways) at different times during operation of the manufacturing system 100, as shown in the example of FIGS. 34-40.

Referring to FIG. 14-22, shown is an example of the base transport system 102 configured as a gantry 112, supporting a planar motor system 140 having a stator base 142 and a plurality of movers 160. The stator base 142 has a stator surface 146 that faces down. Each mover 160 supports a gripper 206 on a telescopic post 172. Although not shown, the planar motor system 140 may also include one or more inspection devices 220 (FIG. 11) and one or more cutting devices 202 (e.g., FIG. 12), each supported on a mover 160.

Figure 14:
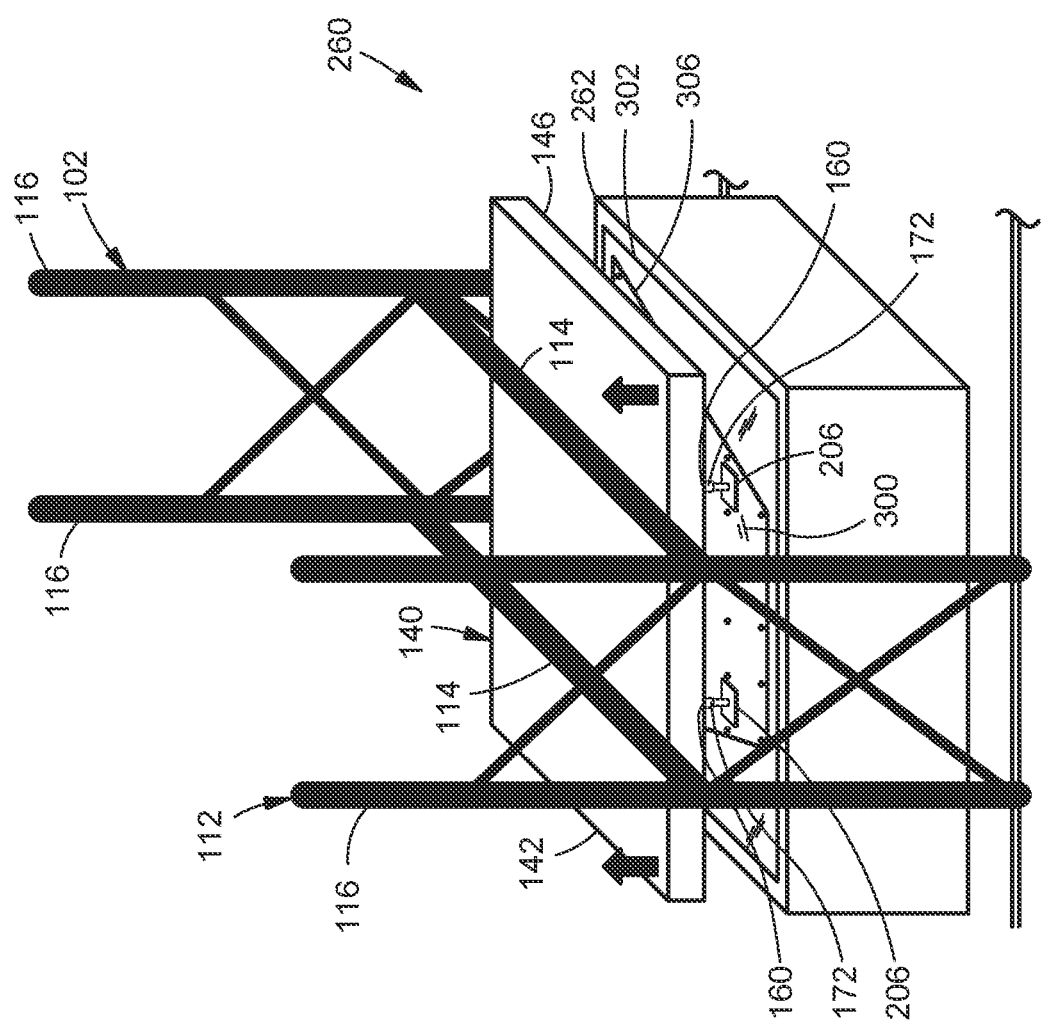
FIG. 14 shows the planar motor system lowered via the gantry to a height allowing the grippers to engage with the material sheet on the material cutting table.

In FIG. 14, the controller 240 commands the gantry 112 to lower the stator base 142 to a height above the material cutting table 262. The material cutting table 262 is configured to support raw material 302, such as composite fabric in planar form. The material sheet 300 (e.g., a composite ply) has been cut out of the raw material 302 along cut lines 306, using a conventional cutting machine, such as a two-dimensional ply cutter (not shown).

As shown in FIG. 14, the controller 240 commands the plurality of grippers 206 to engage the material sheet 300 at a corresponding plurality of engagement points 312 (FIG. 3) distributed throughout the material sheet 300. The material sheet 300 may also include a plurality of control points 310 (FIG. 3) distributed throughout the material sheet 300. The control points 310 enable tracking of the pickup, placement, and forming of the material sheet 300 via the inspection devices 220. The grippers 206 may be engaged to the engagement locations in a planned sequence during pickup of the material sheet 300, Referring to FIGS. 14-15, under command of the controller 240, the gantry 112 raises the planar motor system 140 to thereby pick the material sheet 300 up off the material cutting table 262, leaving only scrap material 304. In some examples, the telescopic posts 172 may be partially retracted to facilitate extraction of the material sheet 300 from the raw material 302 on the material cutting table 262. Alternatively or additionally, the controller 240 may be configured to adjust the positions of the movers 160 relative to each other on the stator surface 146, and/or adjust the orientations of the grippers 206, to facilitate extraction of the material sheet 300.

During the initial stage of lifting the material sheet 300 off the material cutting table 262, the inspection devices 220 (FIG. 20) can inspect the cut lines 306 for any uncut material (e.g., uncut fibers of a composite ply) that may inhibit extraction of the material sheet 300 from the raw material 302. Toward this end, the inspection devices 220 may be configured as visual cameras, or the grippers 206 may have force sensors, or any one of a variety of other devices may be included with the manufacturing system 100 for detecting uncut material along the cut lines 306. The planar motor system 140 may include one or more cutting devices 202 (FIG. 12), each mounted to a mover 160, for cutting any uncut material detected by the inspection devices 220. Alternatively, any uncut material can be manually cut by a technician.

Figure 15:
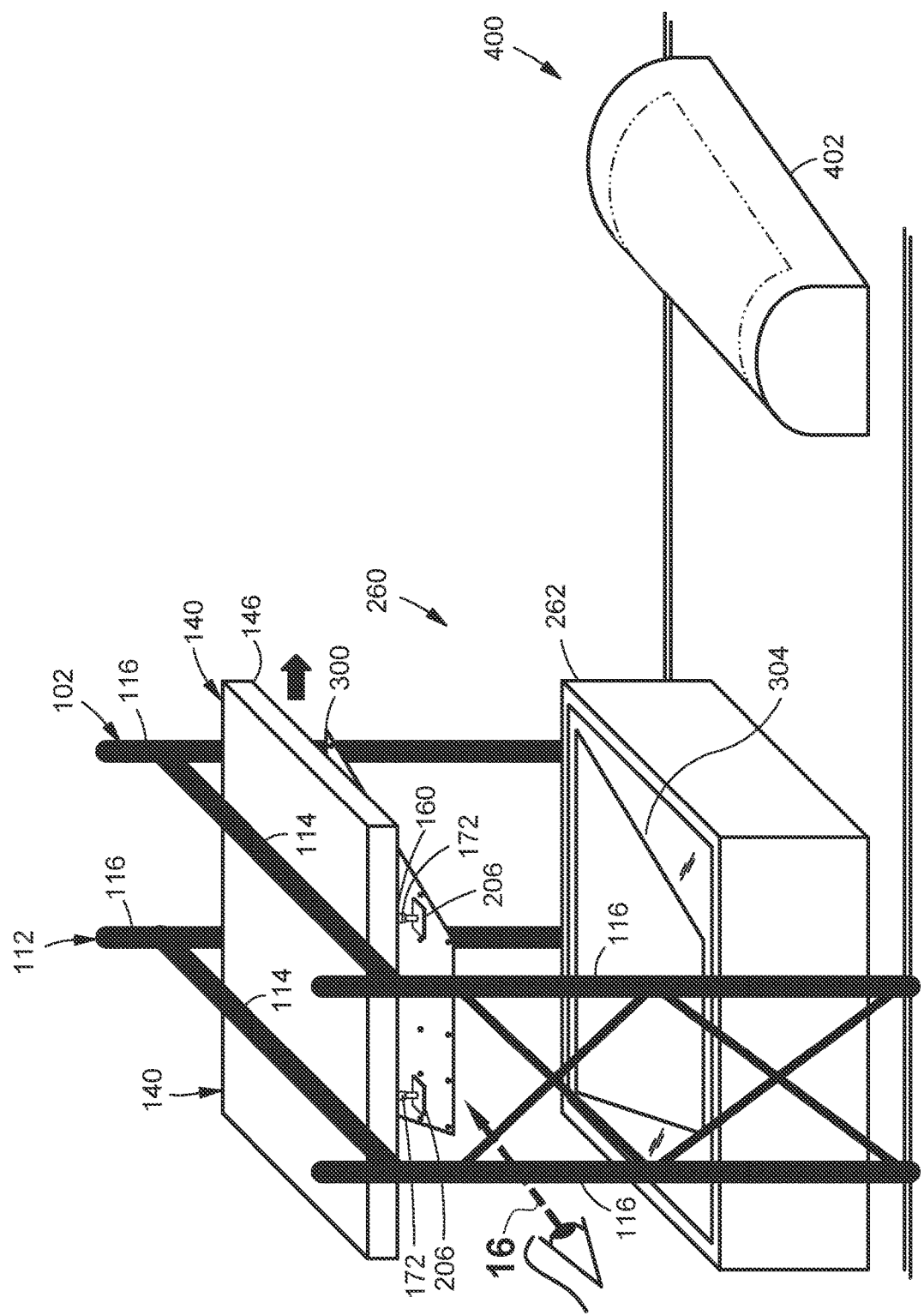
FIG. 15 shows the planar motor system and the material sheet raised above the material cutting table via the gantry.
Figure 16:
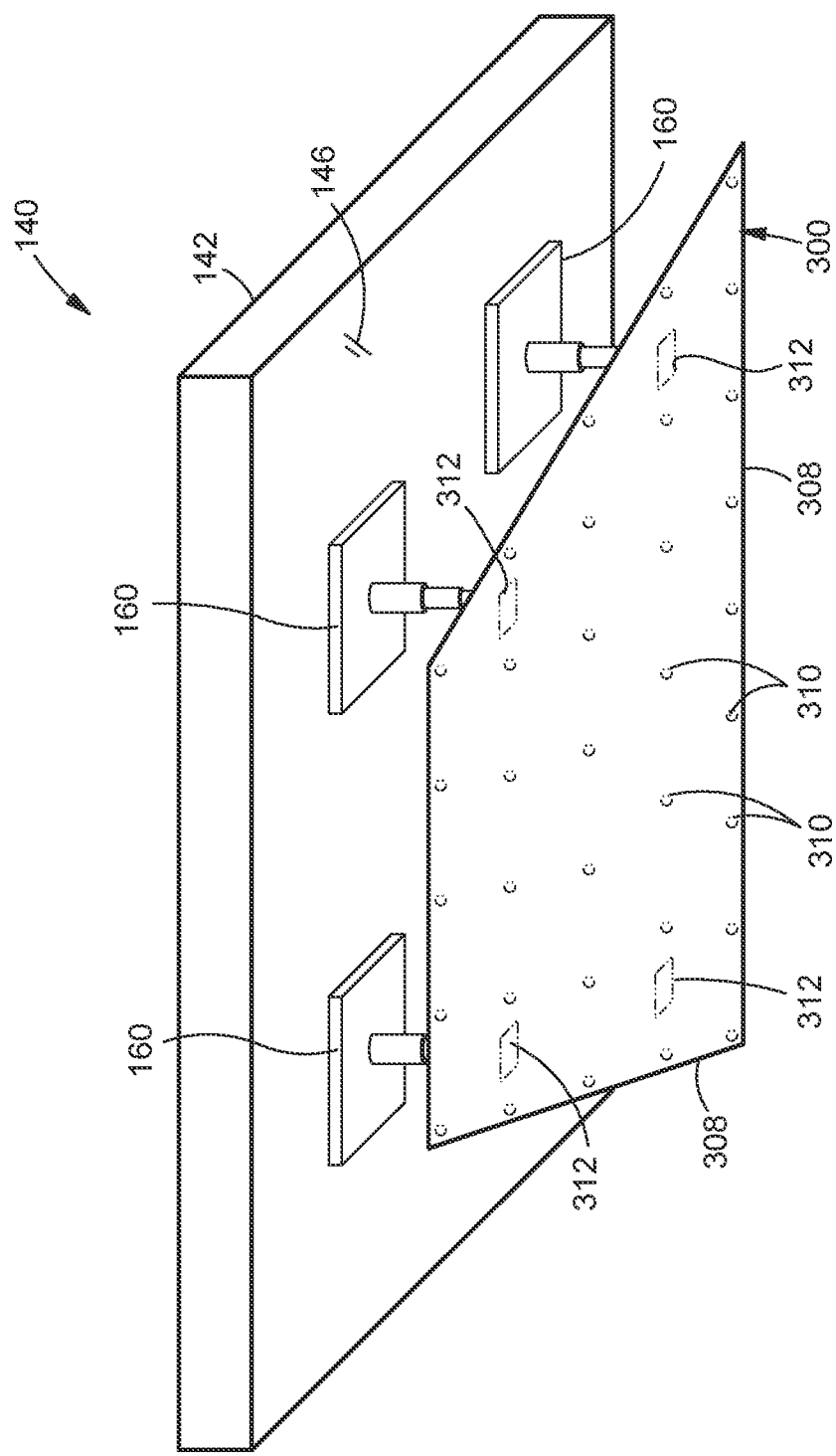
FIG. 16 is a bottom-up perspective view of the planar motor system taken along line 16 of FIG. 15, and showing the material sheet engaged by the grippers.
Figure 17:
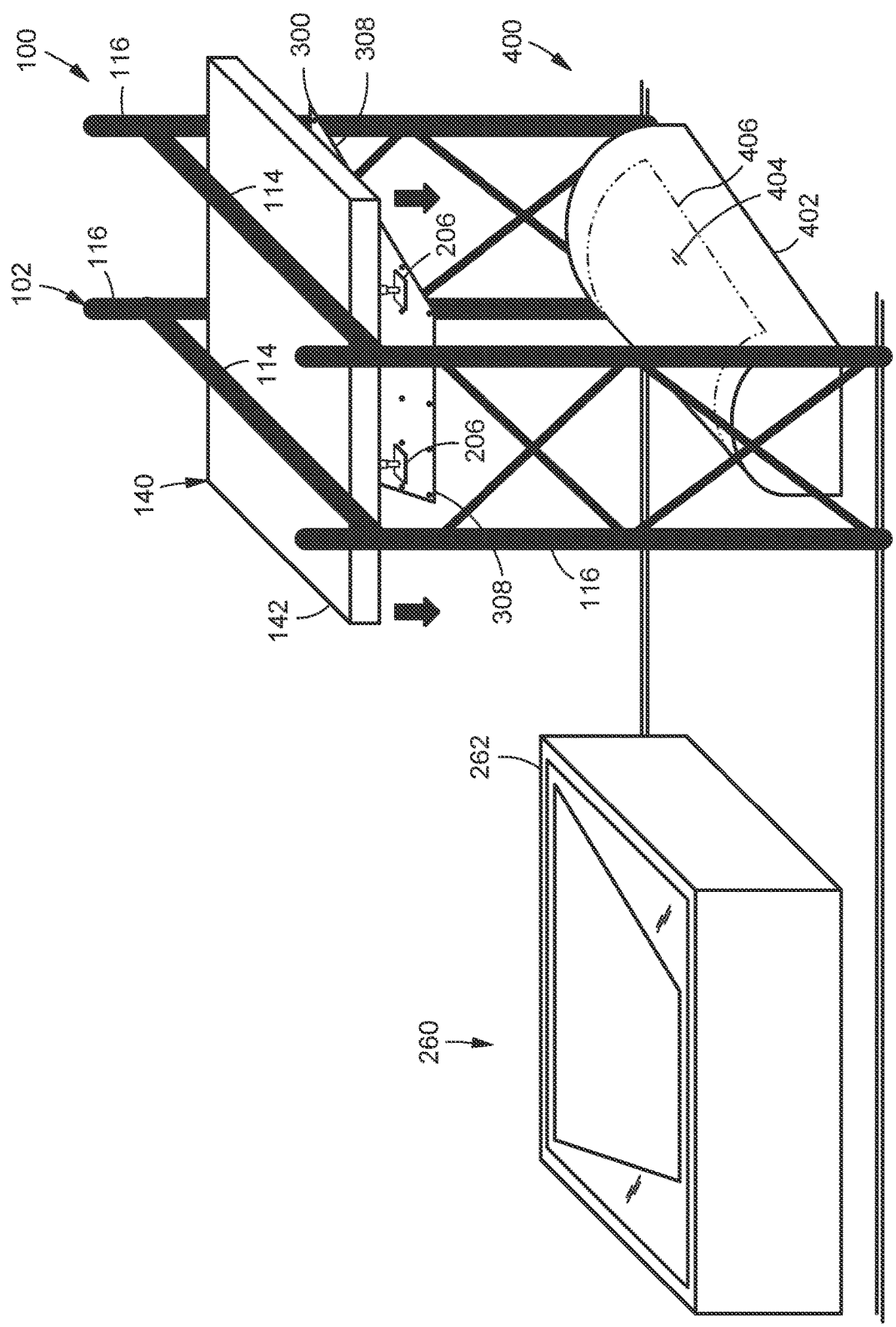
FIG. 17 shows the planar motor system positioned directly above the layup tool.

FIG. 15 shows the material sheet 300 vertically raised by the gantry 112 above the material cutting table 262. FIG. 16 shows the material sheet 300 engaged to the grippers 206 at the engagement points 312. FIG. 17 shows the gantry 112 transporting the planar motor system 140 and material sheet 300 from the material cutting station to the material placement station 400. At the material placement station 400, the material sheet 300 is suspended above the tooling surface 404 of the layup tool 402. The manufacturing system 100 may include one or more laser projectors (not shown) configured to project edge locations 406 onto the tooling surface 404. The edge locations 406 define the intended location of the sheet edges 308 of the material sheet 300 when accurately positioned and formed over the tooling surface 404.

Figure 18:
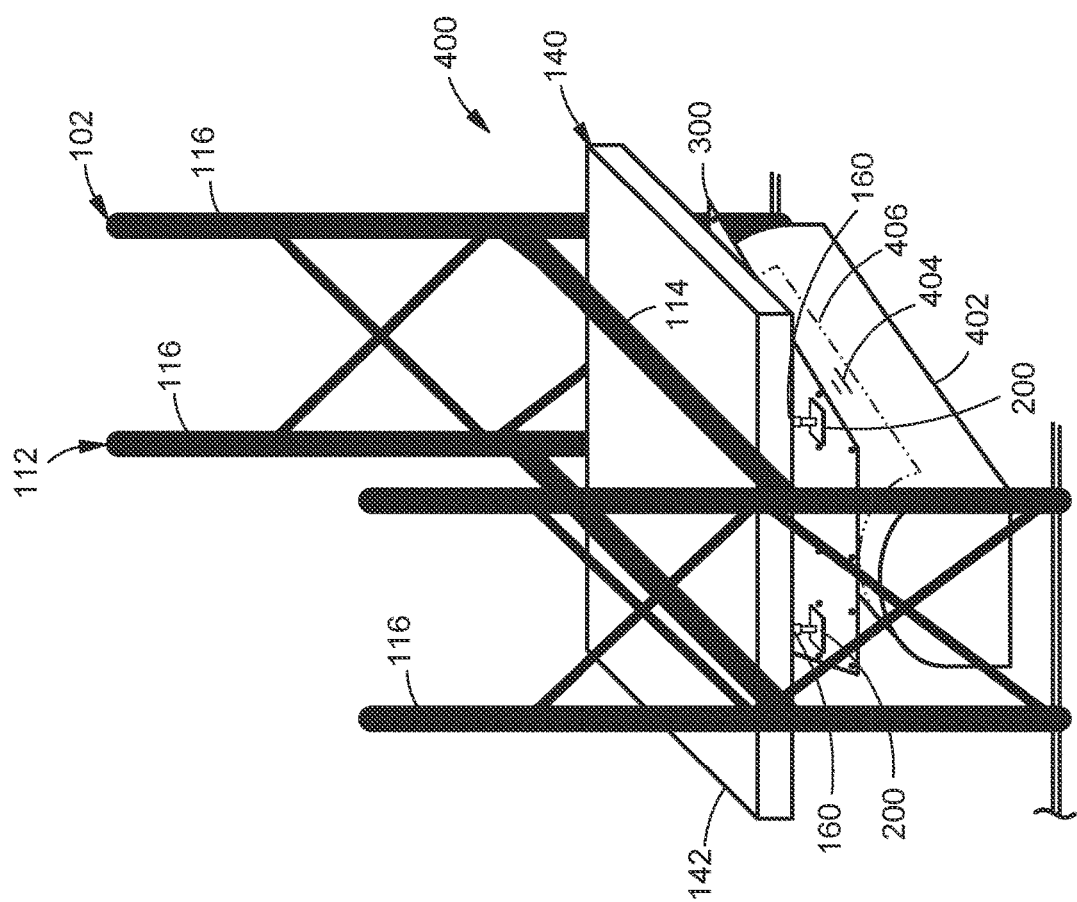
FIG. 18 shows the planar motor system and material sheet lowered into close proximity to the layup tool for application of the material sheet onto the tooling surface.
Figure 19:
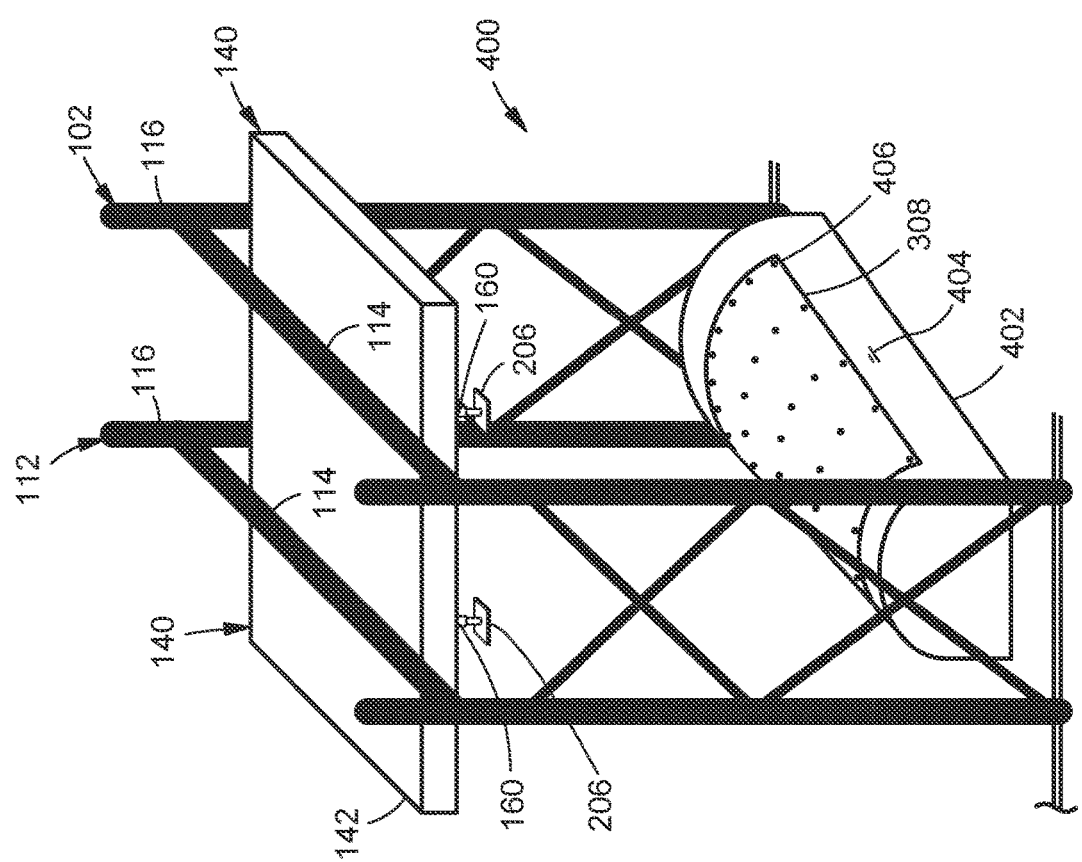
FIG. 19 shows the planar motor system raised above the layup tool after the material sheet has been applied to the tooling surface.

Referring to FIGS. 18-19, the controller 240 is configured to command the gantry 112, the movers 160, and the end effectors 200 (e.g., the grippers 206, the compaction devices 216, the tacking devices 212, and/or the inspection devices 220) to operate in a coordinated manner for placing the material sheet 300 on the tooling surface 404 which, in the example shown, is non-planar. The controller 240 is configured to command the adjustment of the positions and/or orientations of the movers 160 and/or the grippers 206 as required during placement and forming of the material sheet 300 on the tooling surface 404. After successful placement of the material sheet 300, the controller 240 commands the plurality of grippers 206 to disengage from the engagement points 312. The controller 240 commands the gantry 112 to raise the planar motor system 140 as shown in FIG. 19, and return to the material pickup station 260 (FIG. 14) to repeat the process of picking up a material sheet 300 for placement on the previously applied material sheet 300 on the layup tool 402.

Figure 20:
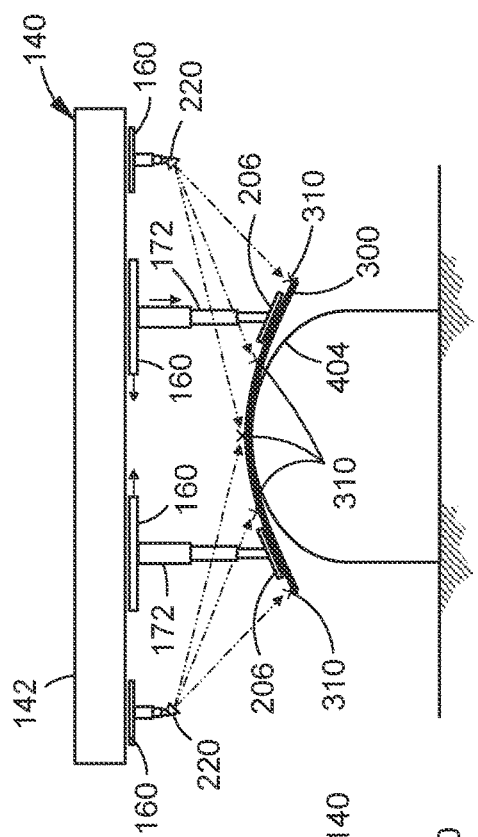
FIG. 20 is a diagrammatic sectional view of the planar motor system and layup tool during the initial stage of applying the material sheet to the tooling surface.

Referring to FIGS. 20-23, in some examples, the controller 240 commands the inspection devices 220 to monitor and record the movement of the control points 310 during forming of the material sheet 300 over the tooling surface 404. As described below, the recordings of the control point movements can be analyzed to determine the accuracy of the positioning of the material sheet 300 on the tooling surface 404 during and after forming. FIG. 20 illustrates an initial stage of forming in which the material sheet 300 is in a planar configuration. As shown in FIG. 23, a localized portion 314 (indicated as a cross-hatched region) of the planar material sheet 300 is initially in contact with the layup tool 402, while remaining portions of the material sheet 300 are initially separated from the tooling surface 404. Also shown in FIG. 23 is the optional application of tensile force 316 to the material sheet 300 via the grippers 206 (FIGS. 20-22) at the engagement points 312. The tensile forces 316 can be applied in a manner that reduces or minimizes the occurrence of wrinkles in the material sheet 300 during forming over the tooling surface 404.

Figure 21:
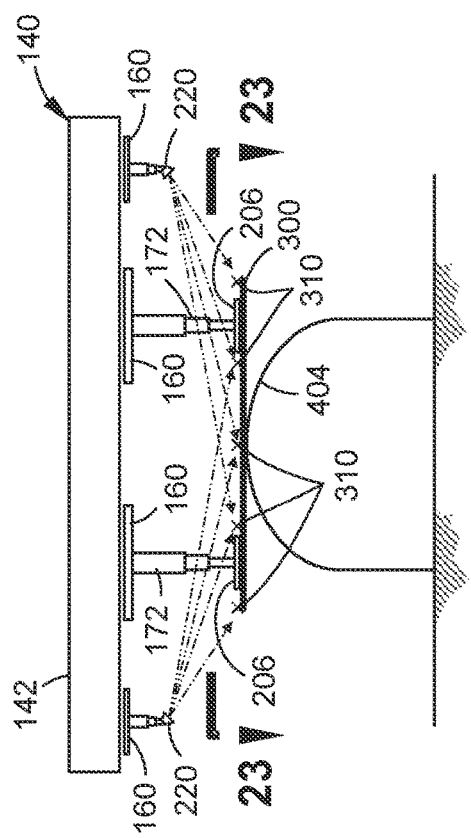
FIG. 21 is a diagrammatic sectional view of the planar motor system and layup tool showing the reorientation and repositioning of the grippers during an intermediate stage of forming the material sheet over the tooling surface.

FIG. 21 shows the material sheet 300 in an intermediate stage of forming. The controller 240 commands the movement of the movers 160 and/or the grippers 206 in a manner to incrementally form the material sheet 300 over the tooling surface 404. For example, the controller 240 can command the movers 160 on opposite sides of the tooling surface 404 to move slightly toward each other (e.g., toward the centerline of the layup tool 402) as the material sheet 300 conforms to the convex curvature of the tooling surface 404. Simultaneously, the controller 240 can command the telescopic posts 172 to gradually extend as the grippers 206 gradually move the material sheet 300 toward contact with the tooling surface 404.

Figure 22:
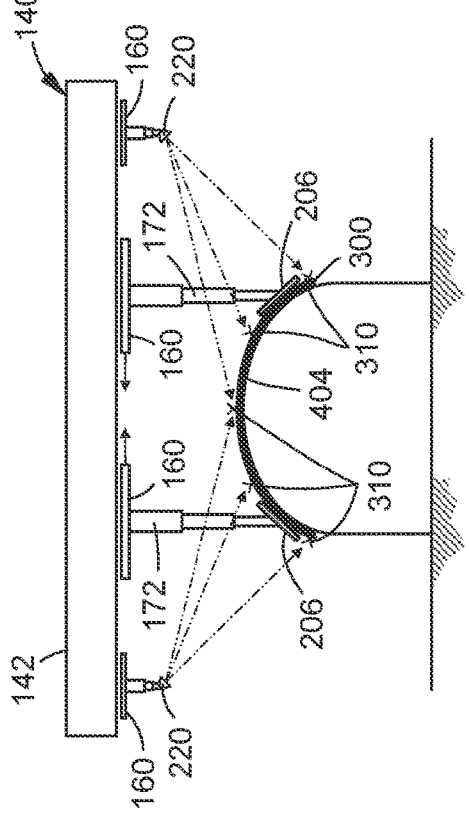
FIG. 22 is a diagrammatic sectional view of the planar motor system and layup tool showing the reorientation and repositioning of the grippers at the completion of forming the material sheet over the tooling surface.

FIG. 22 shows the completion of the forming process, illustrating the additional reorientation and/or repositioning of the movers 160 and/or grippers 206 to conform the material sheet 300 to the curvature of the tooling surface 404. In FIGS. 20-22, the inspection devices 220 closely monitor and record movement of the control points 310 on the material sheet 300. In addition, the inspection devices 220 may monitor and record any tensile forces 316 applied by the grippers 206 at their respective engagement points 312. Toward this end, each gripper 206 may include a force sensor (not shown) configured to measure the magnitude and direction of the tensile force 316 applied at its engagement point 312. The inspection devices 220 are also configured to record the formation of any wrinkles (not shown) occurring in each material sheet 300 during and/or at completion of the forming process.

As described in greater detail below, the above-noted information recorded by the inspection devices 220 during the forming process is continuously fed to the controller 240 as each material sheet 300 (e.g., composite ply) is applied to the layup tool 402. The controller 240 contains a processor (not shown) configured to use artificial intelligence (e.g., machine learning) to analyze the tensile force 316 at each engagement point 312 and the movement of each control point 310 during the forming process, and the resulting wrinkles (e.g., wrinkle quantity, location, size, and direction) occurring in each material sheet 300. Based on the analysis, the processor is configured to make adjustments to the controller software that controls the movements of the base transport system 102, the movers 160, and/or the end effectors 200, in a manner to reduce wrinkle formation in subsequently applied material sheets 300. For example, the controller software may be adjusted in a manner that slightly alters the direction and/or magnitude and/or sequence of tensile forces 316 applied at one or more the engagement points 312.

Figure 24:
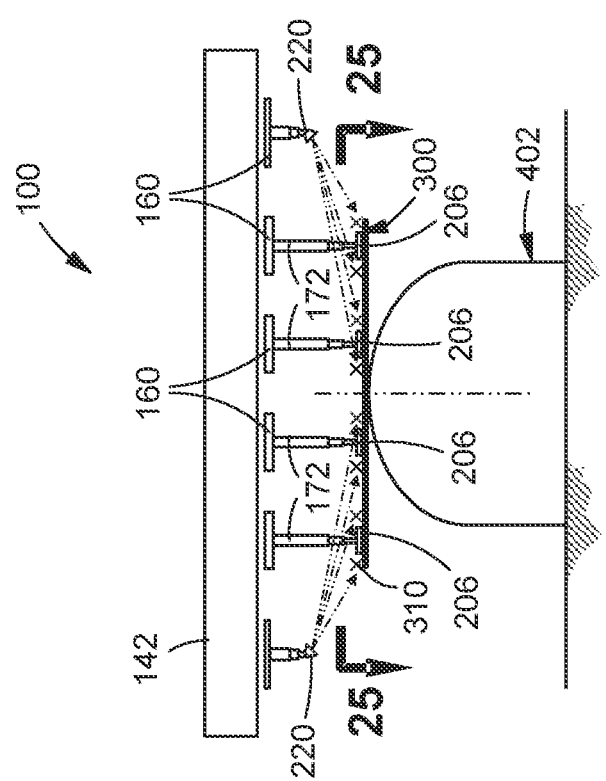
FIG. 24 is a diagrammatic sectional view of an example of a planar motor system containing a relatively large quantity of movers and grippers engaging the material sheet at a corresponding plurality of engagement points.
Figure 27:
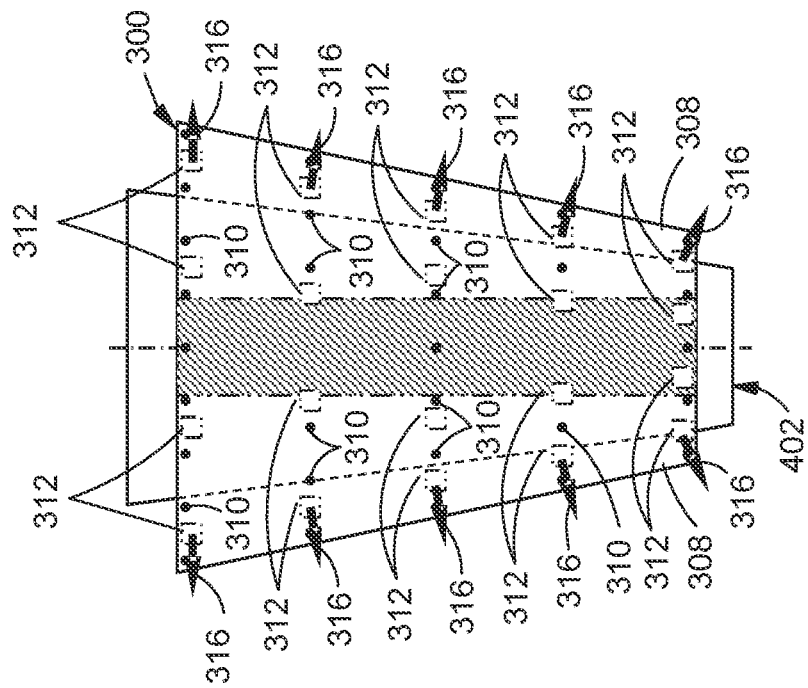
FIG. 27 is a top-down view of the material sheet taken along line 27-27 of FIG. 26, and illustrating the application of tensile forces to the material sheet via the grippers at the engagement points.
Figure 26:
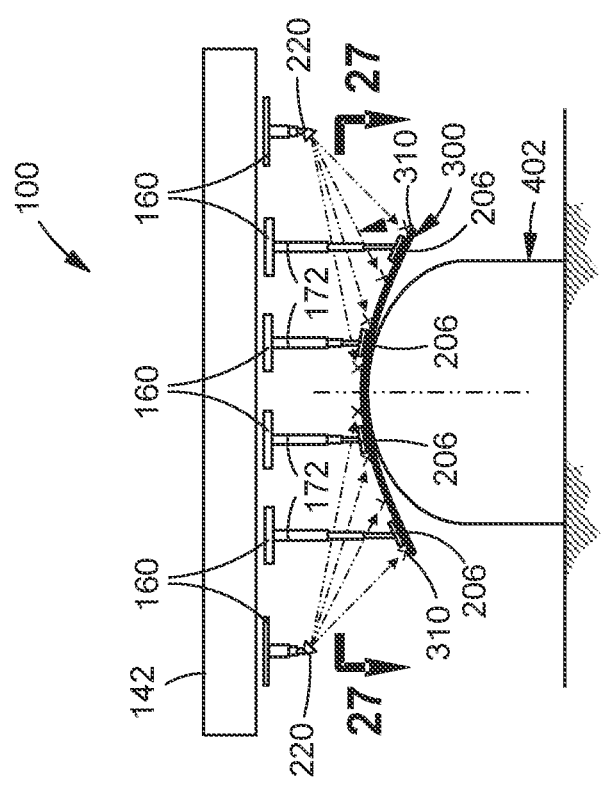
FIG. 26 is a diagrammatic sectional view of the planar motor system of FIG. 24 showing the reorientation and repositioning of the grippers during an intermediate stage of forming the material sheet over the tooling surface.

Referring briefly FIGS. 24-27, shown in FIGS. 24 and 26 are side views of an example of a manufacturing system 100 containing a large quantity of grippers 206, which are engaged to a corresponding number of engagement points 312 on the material sheet 300 (FIGS. 25 and 27). FIGS. 24-25 to show an initial stage of applying the planar material sheet 300 onto the layup tool 402, resulting in the localized portion 314 (shown in crosshatch) in contact with the tooling surface 404. FIGS. 26-27 show an intermediate stage of forming the material sheet 300 over the tooling surface 404. As mentioned above, the controller software may also be revised in a manner to adjust the sequence with which tensile forces 316 are applied to the engagement points 312. For example, during the initial application of the material sheet 300, the grippers 206 that are nearest the localized portion 314 (e.g., the inboard grippers) can apply tensile forces 316 at their corresponding engagement points 312, while the grippers 206 nearest the sheet edges 308 (e.g., the outboard grippers) apply minimal or no tensile force at their engagement points 312. At the intermediate stage of forming shown in FIGS. 26 and 27, the grippers 206 nearest the sheet edges 308 can apply tensile forces 316 at their corresponding engagement points 312, while the inboard grippers 206 stop applying tensile force to their engagement points 312, as such engagement points 312 are in contact with the layup tool 402 at that point during the forming process. The manufacturing system 100 of FIGS. 24-27 can include inspection devices 220 (mounted to the movers 160) and configured to monitor the movement of the control points 310 for feedback to the controller 240, to facilitate adjustment of the movements of the movers 160 and grippers 206, for improving the accuracy with which the material sheet 300 is positioned and formed over the tooling surface 404.

Referring to FIGS. 28-33, shown is an example of the manufacturing system 100 wherein the controller 240 (FIG. 1) is configured to cause the movers 160 and end effectors 200 to form the material sheet 300 into a shape complementary to the tooling surface 404, prior to applying the material sheet 300 onto the tooling surface 404. For example, in FIGS. 28 and 30, the material sheet 300 is supported in a planar configuration prior to being applied to the layup tool 402. FIG. 31 shows the material sheet 300 supported in three-dimensional space above the layup tool 402. The movers 160 and the grippers 206 in FIG. 31 have been repositioned and/or reoriented to form the material sheet 300 into a contour that approximately matches the contour of the tooling surface 404, after which the material sheet 300 can be lowered onto the tooling surface, as shown in FIGS. 32-33. The manufacturing system 100 of FIGS. 28-33 can include inspection devices 220 as mentioned above, for monitoring monitor the movement of the control points 310 for feedback to the controller 240, for improving the accuracy with which the material sheet 300 is positioned and formed over the tooling surface 404.

Referring to FIGS. 34-40, shown is an example of a manufacturing system 100 in which the base transport system 102 comprises a plurality of robotic devices 104. Each robotic device 104 has a robot base 106, and one or more arm segments 108 connected by arm joints 110. In the example shown, each robot base 106 is mounted to a robot track 120 that extends between a material pickup station 260 containing a material cutting table 262, and a material placement station 400 containing a layup tool 402. In alternative examples not shown, each robotic device 104 can be fixedly mounted to a shop floor, wall, roof, or other fixed structure.

The manufacturing system 100 of FIGS. 34-40 includes a plurality of stator bases 142, each movably supported by a robotic device 104 (i.e., the base transport system 102). As described above, the stator bases 142 each have a planar stator surface 146 covering an array of electrical coils 144 (FIG. 8) configured to generate an electromagnetic field. Although FIGS. 34-40 show each robotic device 104 supporting a single stator base 142, in other examples not shown, a single robotic device 104 may be configured to support two or more stator bases 142. Although each stator base 142 in FIG. 34-40 is shown as a unitary structure as illustrated in FIG. 4, each stator base 142 can alternatively be comprised of a plurality of tiles 148 assembled in side-by-side relation, as shown in FIG. 5.

The manufacturing system 100 includes a plurality of movers 160 associated with the stator bases 142. Although FIGS. 34-39 show each stator base 142 having two movers 160, each with its own end effector 200. Each stator base 142 can include any number of movers 160, including a single mover 160, or two or more movers 160. As described above, each mover 160 contains multiple permanent magnets 162 (FIG. 8) configured to cause levitated movement of the mover 160 relative to the stator surface 146 in response to electromagnetic fields generated by the electrical coils 144. As mentioned above, the electromagnetic fields are such that the movers 160 are maintained at a fixed mover-stator gap 170 (FIG. 8), regardless of the orientation of the stator surface 146. For example, the movers 160 are maintained at a fixed mover-stator gap 170 regardless of whether the stator surface 146 is upward facing or downward facing as shown in FIGS. 34-38, or non-horizontally oriented as shown in FIG. 39.

As mentioned above, the manufacturing system 100 further includes a plurality of end effectors 200 coupled to the movers 160, and configured to perform one or more functions in relation to a material sheet 300. The end effectors 200 can be any one of the above-described configurations shown in FIGS. 6 and 9-12, or the end effectors 200 can be provided in other configurations not shown.

Figure 34:
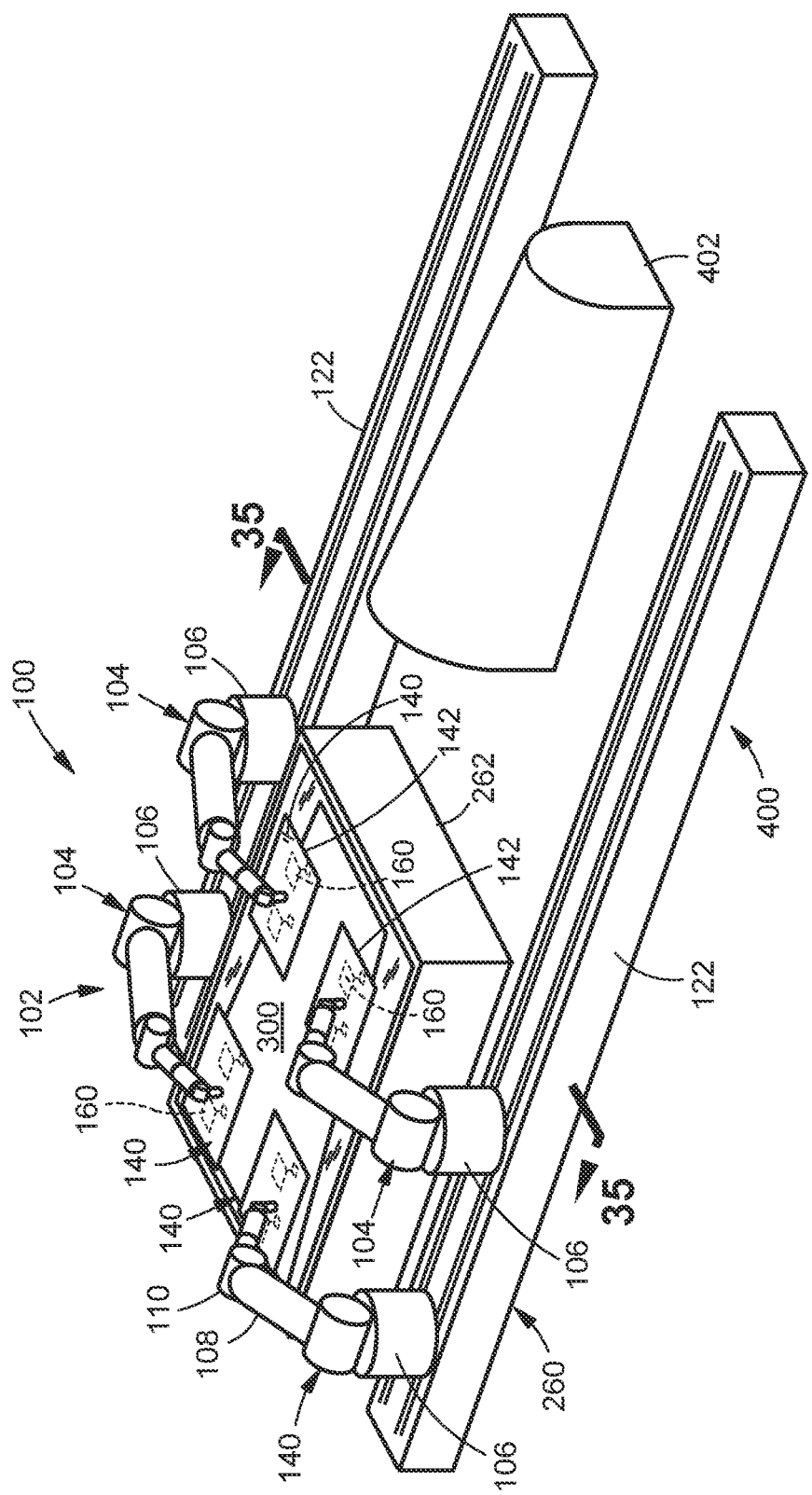
FIG. 34 is a perspective view of a further example of a manufacturing system in which the base transport mechanism comprises a plurality of robotic devices movable along robot tracks, and configured to manipulate a plurality of planar motor systems for engaging and operating on a material sheet, which is shown supported on a material cutting table.

In FIGS. 34-40, the manufacturing system 100 includes a controller 240 (FIG. 35) communicatively coupled to the robotic devices 104, the stator base 142, and the end effectors 200. The controller 240 is configured to cause the movers 160 to move in a coordinated manner to position the plurality of end effectors 200 respectively adjacent to a material sheet 300 located at the material pickup station 260. In the example of FIG. 34, the material sheet 300 is located on the material cutting table 262, similar to the above-described arrangement shown in FIG. 3. The end effectors 200 are shown as grippers 206 (FIG. 35), as described above and shown in FIG. 6.

The controller 240 is configured to cause the plurality of end effectors 200 (e.g., the grippers 206) to engage the material sheet 300 for pickup off of the material staging location, and cause the robotic devices 104 to move the stator bases 142 through an envelope of motion to thereby transport the material sheet 300 from the material pickup station 260 to the material placement station 400. Furthermore, the controller 240 is configured to cause the movers 160 and the end effectors 200 to form the material sheet 300 over the tooling surface 404. As described above, the movers 160 and the grippers 206 can also be manipulated in a manner to locally apply tensile force 316 to the material sheet 300, as shown in FIGS. 25 and 27, described above. Tensile forces 316 can be applied by the grippers 206 in a sequence that reduces or minimizes the occurrence of wrinkles in the material sheet 300. In addition, the direction and magnitude of the tensile force 316 applied at each engagement limitation can be controlled in a manner to minimize the occurrence of wrinkles in the material sheet 300, as described above.

Figure 35:
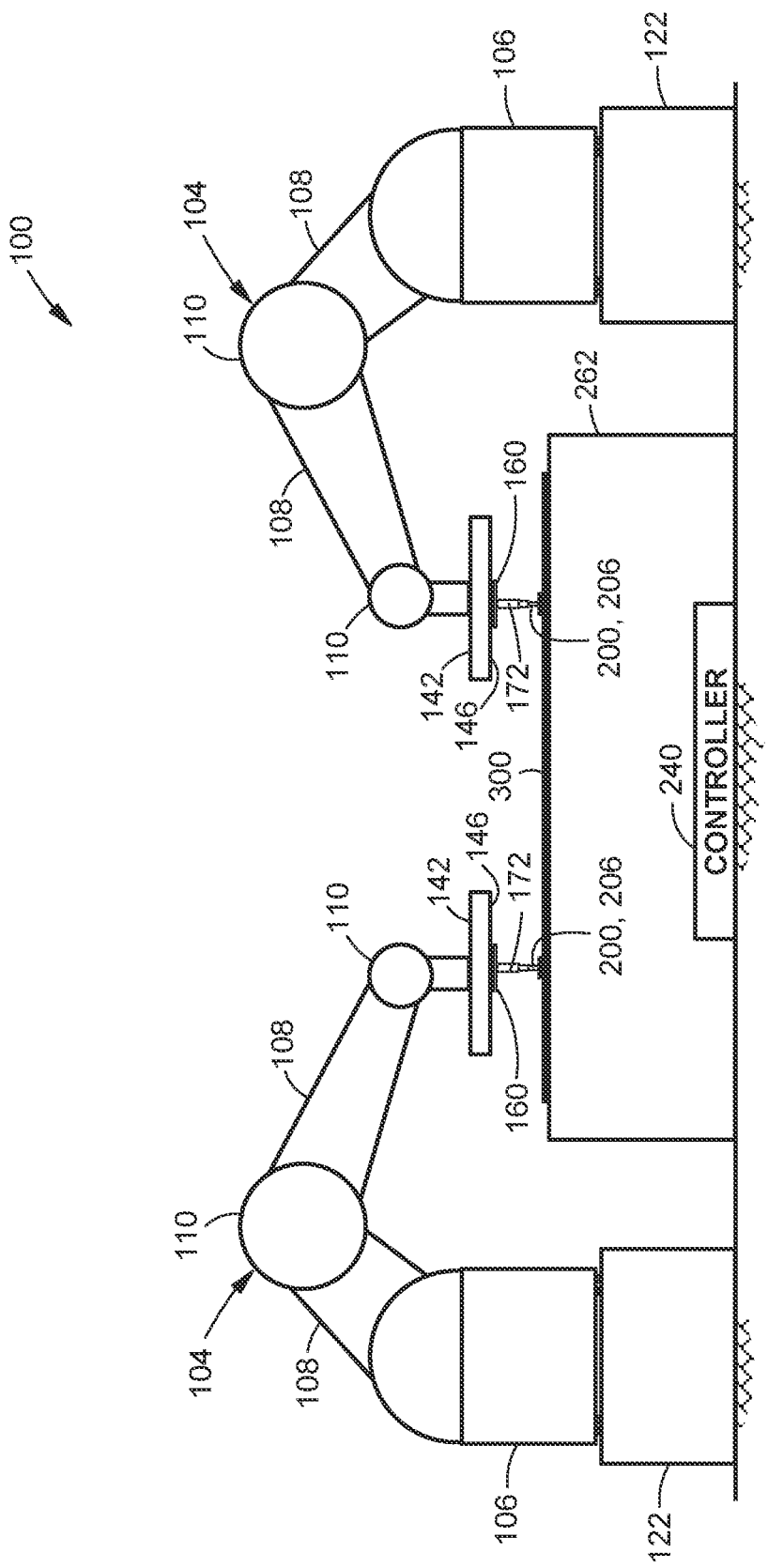
FIG. 35 is a side view of the manufacturing system taken along line 35-35 of FIG. 34, and illustrating the robotic devices positioning the planar motor systems over the material sheet for engagement by grippers.
Figure 36:
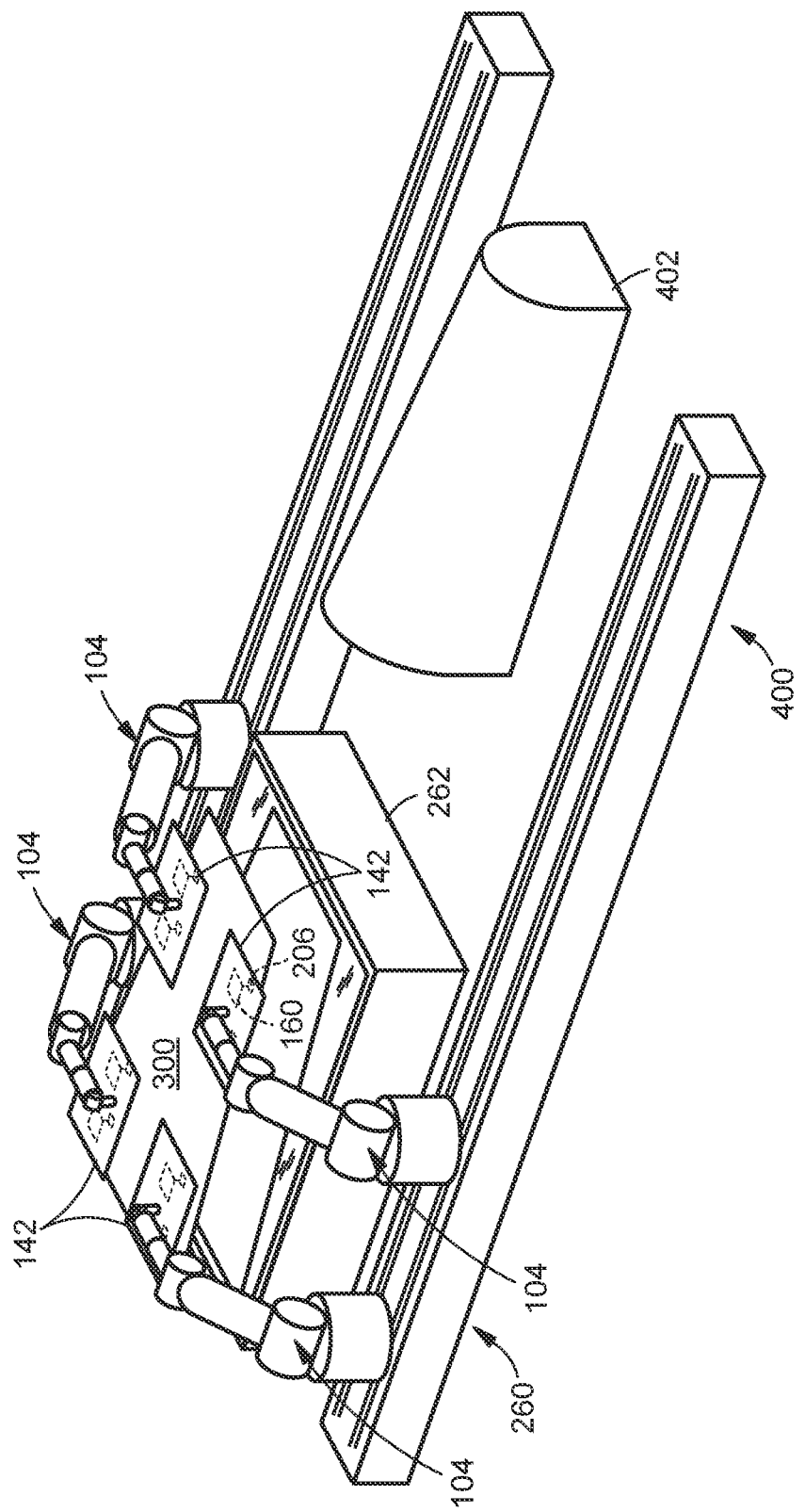
FIG. 36 is a perspective view of the manufacturing system of FIG. 34 showing the robotic devices manipulating the planar motors to thereby raise the material sheet above the material cutting table.
Figure 37:
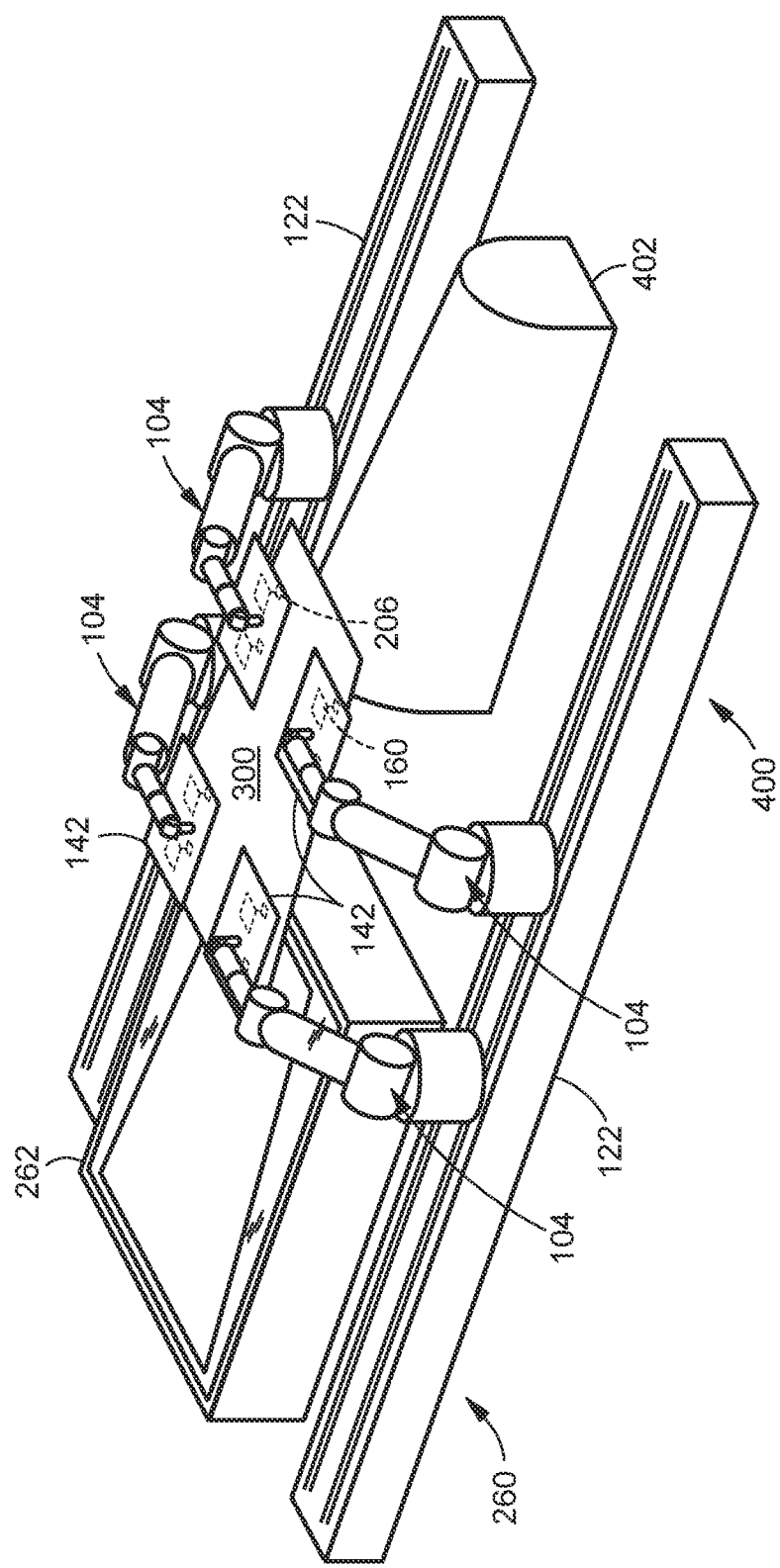
FIG. 37 is a perspective view of the manufacturing system of FIG. 36 showing the robotic devices moving along the robot tracks while transporting the material sheet from the material cutting table to the layup tool.

FIGS. 34-40 illustrate the process of forming a planar material sheet 300 over a layup tool 402 using the robotic devices 104. FIGS. 34-35 show the stator bases 142 positioned by the robotic devices 104 over the material cutting table 262. The grippers 206 are in position for engaging (i.e., gripping) the material sheet 300. FIG. 36 shows the robotic devices 104 being operated in a coordinate a manner to simultaneously raise their respective stator bases 142, thereby lifting the material sheet 300 off of the material cutting table 262. FIG. 37 shows the robotic devices 104 moving along the robot tracks 120 to thereby transport the material sheet 300 from the material cutting table 262 to the layup tool 402.

Figure 38:
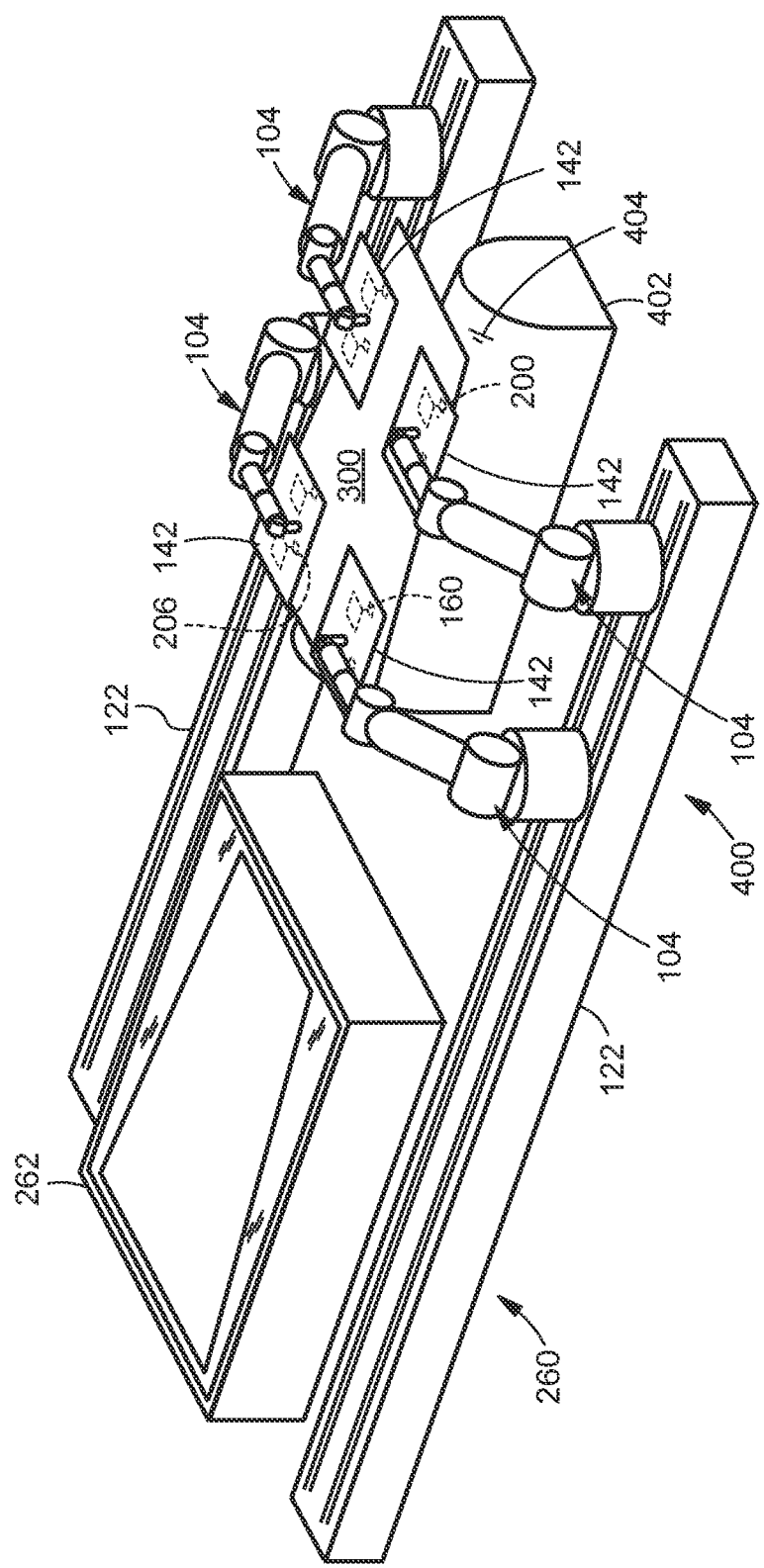
FIG. 38 is a perspective view of the manufacturing system of FIG. 37 showing the robotic devices positioning the material sheet directly over the tooling surface.
Figure 39:
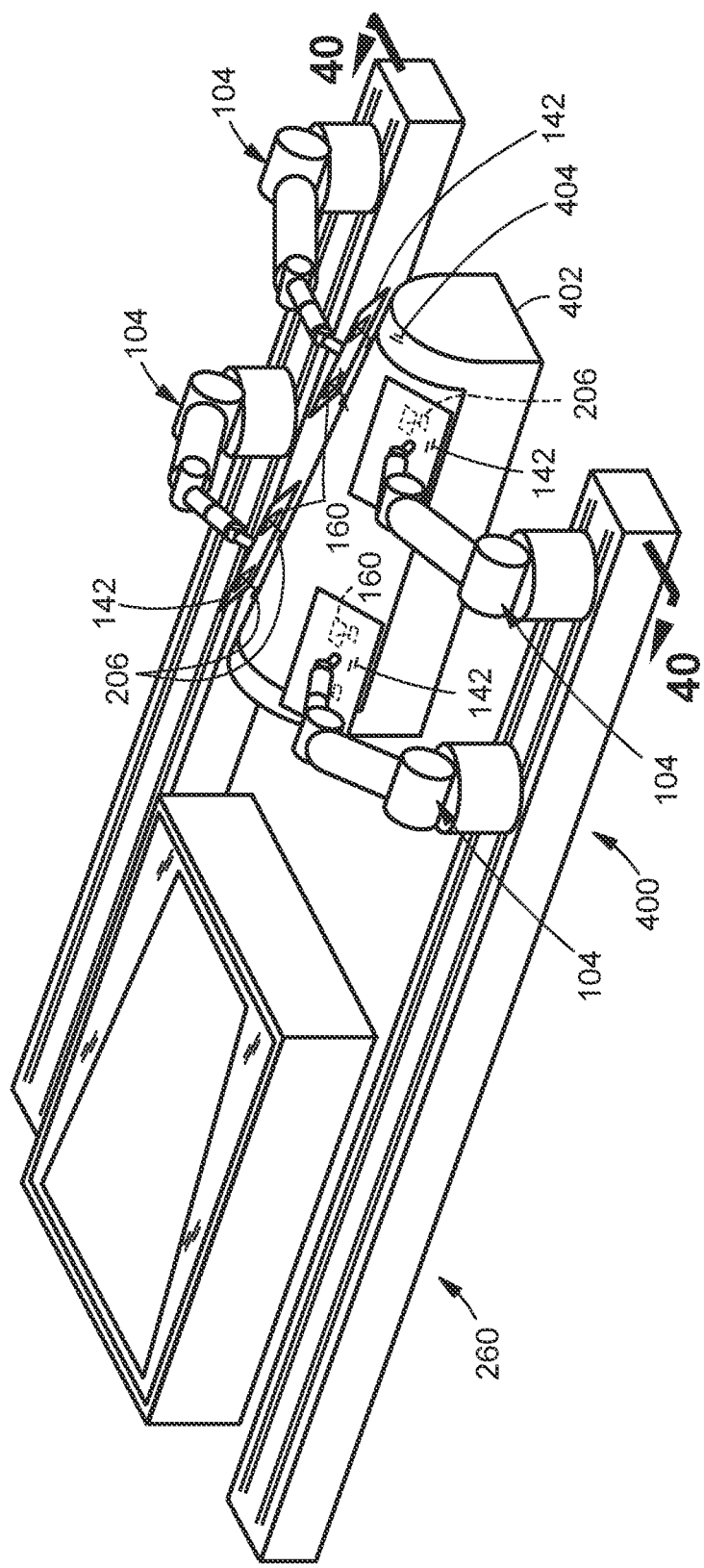
FIG. 39 is a perspective view of the manufacturing system of FIG. 38 showing the reorientation and repositioning of the grippers at the completion of the process of forming the material sheet over the tooling surface.
Figure 40:
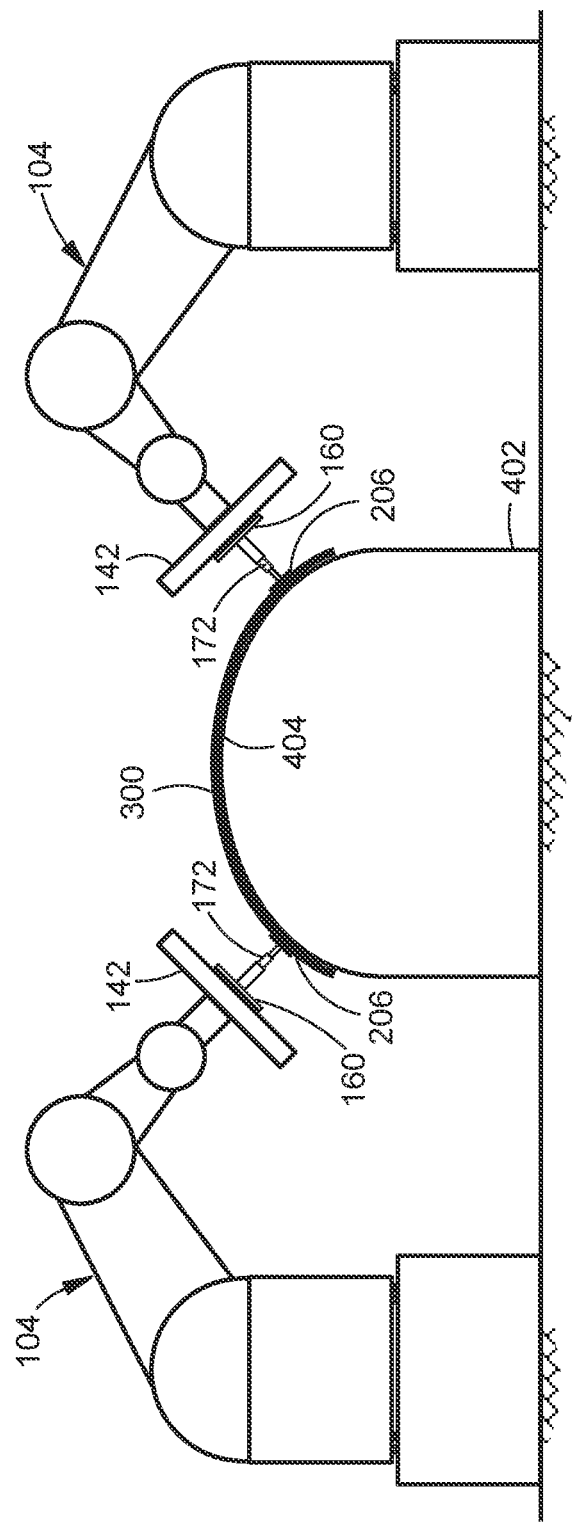
FIG. 40 is a side view of the manufacturing system taken along line 40-40 of FIG. 39, and illustrating the orientation and position of the grippers at the completion of forming the material sheet over the tooling surface.

FIG. 38 shows the stator bases 142 positioning the material sheet 300 over the layup tool 402 in preparation for forming over the tooling surface 404. FIGS. 39-40 show the reorientation and repositioning of the stator bases 142 and grippers 206 at the completion of the process of forming the material sheet 300 over the tooling surface 404. After the forming process is complete, the grippers 206 disengage from the material sheet 300, allowing the robotic devices 104 to return to the material pickup station 260 to repeat the process with another material sheet 300. In some examples, the grippers 206 may disengage from the material sheet 300 in a predetermined sequence, which may help to minimize the occurrence of wrinkles in the material sheet 300.

Any one or more of the components, configurations, and/or functionalities of the manufacturing system 100 described with regard to FIGS. 1-33 are applicable to any one or more of the components, configurations, and/or functionalities of the manufacturing system 100 of FIGS. 34-40. Likewise, any one or more of the components, configurations, and/or functionalities of the manufacturing system 100 described herein with regard to FIGS. 34-40 are applicable to any one or more of the components, configurations, and/or functionalities of the manufacturing system 100 of FIGS. 1-33.

Figure 41:
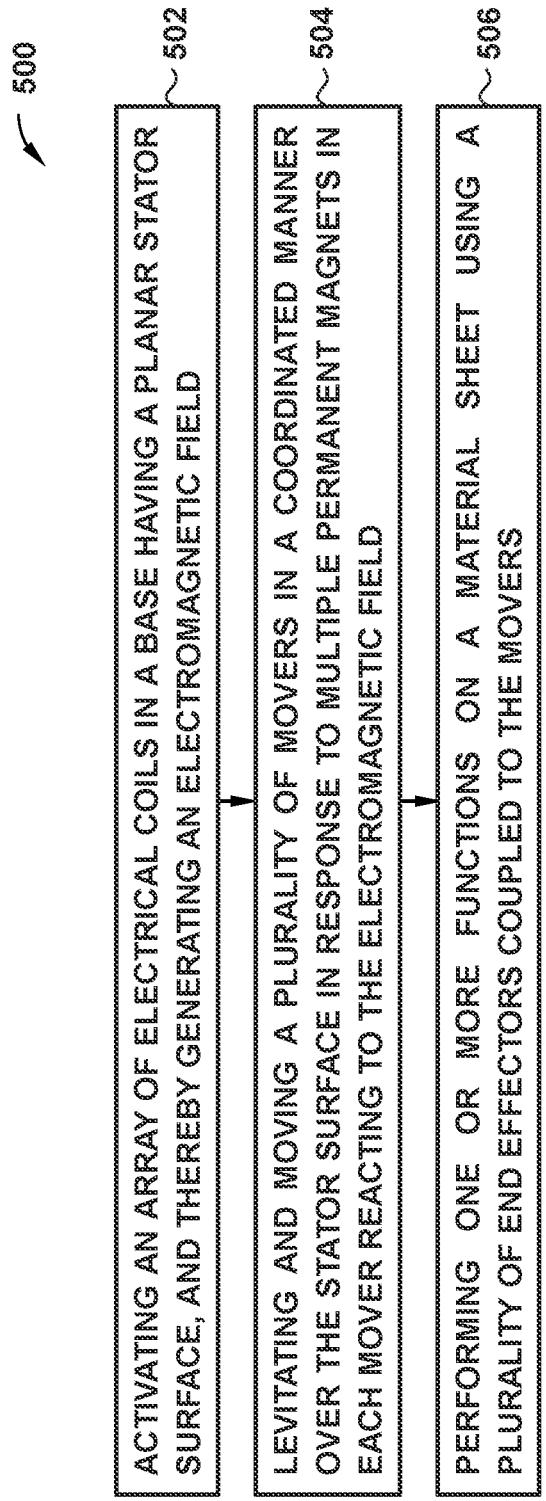
FIG. 41 is a flowchart of operations included in a method of processing a material sheet.

Referring now to FIG. 41, shown are operations included in a method 500 of processing a material sheet 300 using the manufacturing systems 100 as presently disclosed. The method 500 includes supporting the stator base 142 on a base transport system 102. In the example manufacturing system 100 of FIGS. 1-33, the method 500 includes supporting the stator base 142 via a gantry 112. In the example manufacturing system 100 of FIGS. 34-40, the method 500 includes supporting the stator base 142 via one or more robotic devices 104. Regardless of the configuration of the base transport system 102, the method 500 includes moving the stator base 142 through an envelope of motion that enables the end effectors 200 to pick up the material sheet 300 from a material pickup station 260, and move the material sheet 300 over to a material placement station 400.

Referring still to FIG. 41, step 502 of the method 500 includes activating an array of electrical coils 144 (FIG. 8) in a stator base 142 having a planar stator surface 146, and thereby generating an electromagnetic field. The activation of the electromagnetic coils is performed under command of a controller 240, as described above. For the stator base 142 configuration of FIG. 4, step 502 comprises activating an array of electrical coils 144 in a single stator base 142. For the stator base 142 configuration of FIG. 5, step 502 comprises activating an array of electrical coils 144 in each of a plurality of tiles 148 positioned in side-by-side relation to each other and collectively defining the stator base 142.

Step 504 of the method 500 includes levitating and independently moving a plurality of movers 160 in a coordinated manner over the stator surface 146 in response to the electromagnetic field. As described above, each mover 160 contains multiple permanent magnets 162, as shown in FIG. 8.

Step 504 of levitating and moving the plurality of movers 160 comprises moving at least one mover 160 with at least two degrees-of-freedom. Levitating and moving the movers 160 comprises translating each mover 160 in a direction parallel to the stator surface 146 along a mover x-axis 164 and/or along a mover y-axis 166, as shown in FIG. 6 and described above. For example, each mover 160 can move in a direction parallel to the mover x-axis 164, in a direction parallel to the mover y-axis 166, or in any direction angle between the mover x-axis 164 and mover y-axis 166. Levitating and moving the mover 160 can also include rotating the mover 160 about a mover z-axis 168. In still further examples, each mover 160 can be rotated in either direction about the mover z-axis 168, and/or each mover 160 can be slightly tilted (e.g., up to 5 degrees) about the mover x-axis 164 and/or about the mover y-axis 166, as shown in FIG. 7.

Step 506 of the method 500 includes performing one or more functions on a material sheet 300 using one or more end effectors 200 coupled to the movers 160. To facilitate performance of the functions on the material sheet 300, the method 500 can include extending and retracting the end effectors 200 in a direction perpendicular to the stator surface 146 using a telescopic post 172 coupling the end effector 200 to a mover 160, as shown in FIGS. 1-7 and 9-13. Alternatively or additionally, the method 500 can include orienting the end effector 200 using a wrist joint 174 coupling the end effector 200 to one of the movers 160 (e.g., via telescopic post 172) as shown in FIG. 6, and/or using a multi-axis robot as shown in FIG. 13.

In step 506, the functions performed by the end effectors 200 can include engaging and/or operating on an object, such as a material sheet 300. For example, step 506 can include cutting the material sheet 300 using a cutting device 202, such as the knife blade 204 shown in FIG. 12. The cutting device 202 may be required to sever uncut material along a cut line 306 separating a composite ply (i.e., the material sheet 300) from scrap material 304, as shown in FIG. 3.

In another example, step 506 can include engaging with and disengaging from the material sheet 300 using a plurality of grippers 206, each coupled to one of the movers 160. As described above, FIGS. 4-6 show an example of a gripper 206 having a plurality of hooks 210 protruding from a gripper plate 208. However, in other examples, the gripper 206 can include an array of suction cups (not shown) for suction engagement of a material sheet 300, or an electrostatic device (not shown) for electrostatic engagement of a material sheet 300.

Step 506 can also include compacting the material sheet 300 against the tooling surface 404 or against a previously applied material sheet 300 using a compaction device 216. FIG. 9 shows the compaction device 216 as a roller 218 configured to apply compaction pressure on a material sheet 300 against the tooling surface 404. The compaction devices 216 can be applied to the material sheet 300 in a planned sequence to facilitate the forming process as the material sheet 300 is forced down onto the tooling surface 404.

In still further examples, step 506 can include spot fixing the material sheet 300 in position on a layup tool 402 using a tacking device 212. FIG. 10 shows an example of a tacking device 212 configured as a soldering iron 214. However, the tacking device 212 may be provided as any mechanism or device capable of applying localized heat, such as to locally melt the material sheet 300 (e.g., locally melt the resin of a composite ply). The tacking devices 212 can be applied in a planned sequence and/or at planned locations on the material sheet 300 to fix the location and shape of the material sheet 300 during forming.

Step 506 can additionally include monitoring the pickup, placement, and forming of the material sheet 300 on the tooling surface 404 using one or more inspection devices 220. As described above, an inspection device 220 can be a camera, an infrared sensor, a temperature sensor, or any other sensor configuration capable of measuring, observing, and/or sensing the pickup, placement, and forming, or for performing other operations on a material sheet 300. Upon completion of the forming process, all end effectors 200 that can manipulate the shape of the material sheet 300 can be disengaged, and the inspection devices 220 can measure and confirm the shape and location on the material sheet 300 on the tooling surface 404.

The process of engaging with and disengaging from a material sheet 300 using the grippers 206 can be described with reference to FIGS. 14-23. For example, FIG. 14 illustrates a plurality of grippers 206 engaging a gripping a corresponding plurality of engagement points 312 distributed throughout the material sheet 300. As shown in FIG. 14, the material sheet 300 has a planar configuration when supported on the material cutting table 262. The process includes picking up the material sheet 300 by adjusting the positions and/or orientations of the base transport system 102, the movers 160 and/or the grippers 206. For example, FIG. 15 shows the gantry 112 lowering the stator base for pickup of the material sheet 300, followed by raising the stator base 142 to lift material sheet 300 lifting off the material cutting table 262. FIG. 16 shows the underside of the planar motor system 140 illustrating the material sheet 300 supported at the engagement points 312 by the grippers 206, each of which is engaged to a mover 160 that is levitated (i.e., suspended) in relation to the stator surface 146 of the stator base 142.

FIG. 17 illustrates the stator base 142 being moved by the gantry 112 through an envelope of motion to thereby transport the material sheet 300 from the material pickup station 260 to the material placement station 400. FIG. 18 illustrates the placing of the material sheet 300 on the tooling surface 404, which is non-planar. As described above, the process of forming the material sheet 300 to the tooling surface 404 involves re-adjusting the positions and/or orientations of the movers 160 and/or the grippers 206, as shown in FIGS. 20-22. After the material sheet 300 is formed to the tooling surface 404, the process includes disengaging the grippers 206 from the engagement points 312, and moving the stator base 142 away from the tooling surface 404, as shown in FIG. 19.

Referring to FIGS. 20-25, as mentioned above, the process of placing the material sheet 300 on the tooling surface 404 comprises moving the stator base 142, the movers 160, and/or the grippers 206. For example, the stator base 142 can be vertically translated via a gantry 112, via robotic devices 104, or by other means, to initially place a localized portion 314 (see FIG. 25—cross-hatched region) of the material sheet 300 in contact with the tooling surface 404, while remaining portions of the material sheet 300 are separated from the tooling surface 404. The placement of the material sheet 300 on the tooling surface 404 can also include translating the movers 160 in a direction parallel to the stator surface 146, and re-orienting and/or repositioning the z-location of the grippers 206 in a manner that facilitates the forming of the material sheet 300 over a tooling surface 404.

As shown in FIG. 25, the processor can additionally command the movement of the movers 160 and grippers 206 to apply tensile force 316 to the material sheet 300, while incrementally forming the remaining portions of the material sheet 300 onto the tooling surface 404. As mentioned above, each tensile force 316 is independently applied by one of the grippers 206 at its engagement point 312 with the material sheet 300. The tensile forces 316 are applied as a result of translation of the movers 160 in a plane parallel to the stator surface 146. The tensile forces 316 can be applied at the same or different magnitudes and/or in different directions, as commanded by the controller 240.

The method 500 can include recording one or more parameters of the forming process using one or more inspection devices 220 while forming the material sheet 300 over the tooling surface 404. For example, the inspection devices 220 can record the location on the tooling surface 404 where the localized portion 314 of the material sheet 300 is initially placed in contact with the tooling surface 404. As mentioned above, the manufacturing system 100 may include one or more laser projection devices configured to project edge locations 406 on the tooling surface 404. The inspection devices 220 can record images of the locations of the sheet edges 308 relative to the edge locations 406 projected by the laser projectors, and thereby determine the accuracy with which the material sheet 300 is applied to the tooling surface 404.

Referring to FIG. 23, as mentioned above, the inspection devices 220 can record the sequence with which tensile forces 316 are applied to the material sheet 300 at the engagement points 312, and the magnitude and direction of each tensile force 316. The application of tensile forces 316 at the engagement points 312 may reduce the quantity or size of wrinkles that can occur in the material sheet 300 at the completion of the forming process. The inspection devices 220 can also record the movement of control points 310 on the material sheet 300, as a means to record the various shapes assumed by the material sheet 300 as it is formed over the tooling surface 404. At the completion of the forming process, the inspection devices 220 can record the quantity, location, size (e.g., height and width), and lengthwise direction of each wrinkle in each material sheet 300.

As mentioned above, the controller 240 (i.e., processor) can use artificial intelligence (i.e., machine learning, or deep learning) to analyze the parameters recorded by the inspection devices 220, as a means to assess the accuracy and quality with which the material sheet 300 is formed over the tooling surface 404. For example, the processor can analyze the sequence, magnitude, and direction of the tensile forces 316, and the movement of the control points 310 during the forming process, and the quantity, location, size, and direction of wrinkles occurring in the formed material sheet 300. The processor can make adjustments to the software program that the controller 240 operates on for controlling the movements of the movers 160 and the end effectors 200 during the application of subsequently applied material sheets 300. In this regard, the adjustments are made with the intent of reducing the quantity and/or size of wrinkles in the material sheets 300. In one example, the processor can adjust the sequence with which the tensile forces 316 are applied to the material sheet 300 at the different engagement points 312, as described above with regard to FIGS. 24-25. Alternatively or additionally, the processor can adjust the magnitude and/or direction of the tensile forces 316. The above-described process of recording the forming of each material sheet 300, analyzing the recorded data, and adjusting the software, can be repeated for each material sheet 300, until all of the material sheets 300 (e.g., all composite plies of a composite laminate) have been applied to the layup tool 402.

Figure 28:
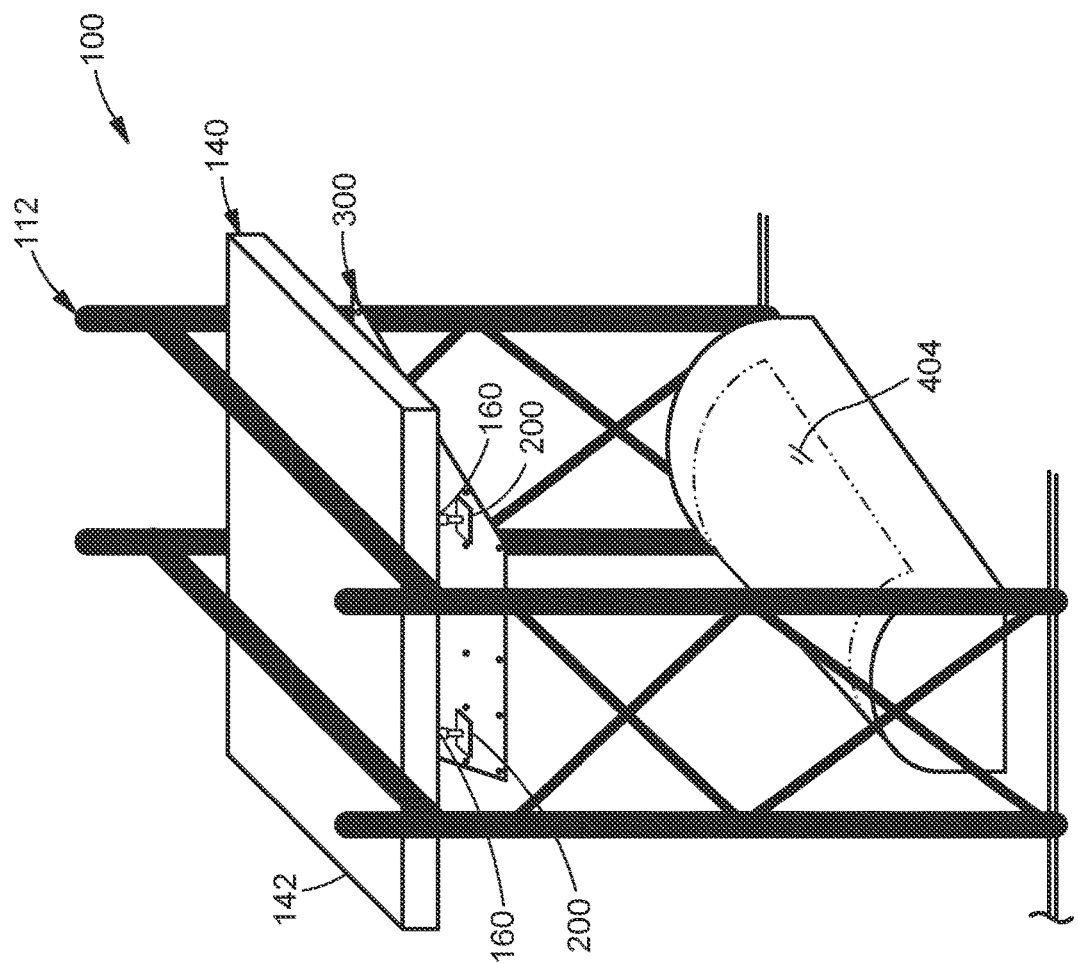
FIG. 28 shows the planar motor system and material sheet raised up over the layup tool.
Figure 29:
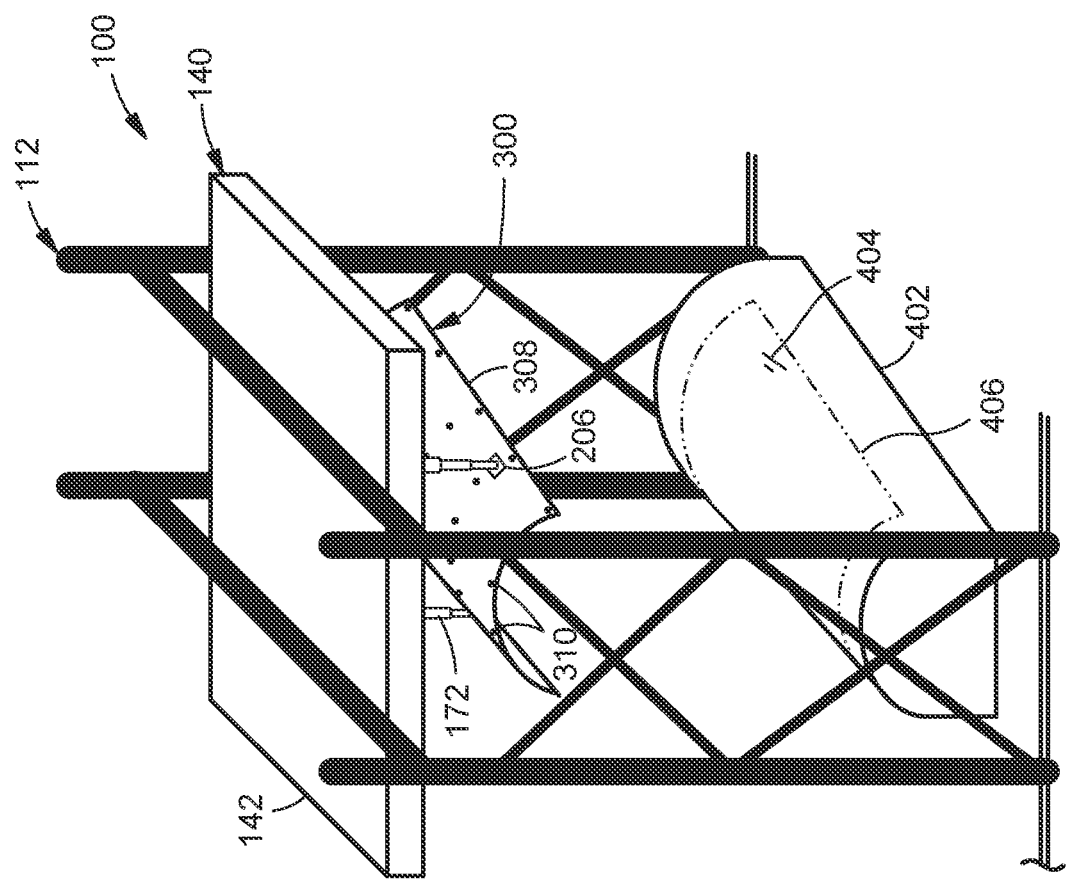
FIG. 29 shows the material sheet formed into a shape complementary to the tooling surface while the material sheet is supported in three-dimensional space above the layup tool.

Referring briefly to FIGS. 28-29, in some examples, the method can include forming the material sheet 300 in three-dimensional space prior to applying the material sheet 300 to a tooling surface 404. For example, as described above, the method 500 can include positioning the movers 160, extending or retracting the telescopic posts 172, and reorienting the end effectors 200 in a manner to form a planar material sheet 300 (e.g., FIG. 28) into a shape complementary to the tooling surface 404 (e.g., FIG. 29), prior to placing the material sheet 300 on the tooling surface 404.

Many modifications and other versions and examples of the disclosure will come to mind to one skilled in the art to which this disclosure pertains having the benefit of the teachings presented in the foregoing descriptions and the associated drawings. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A manufacturing system, comprising:
a stator base having a planar stator surface covering an array of electrical coils configured to generate an electromagnetic field;
a plurality of movers, each containing multiple permanent magnets configured to cause the movers to levitate and move relative to the stator surface in response to the electromagnetic field;
one or more end effectors coupled to the movers, each end effector configured to perform one or more functions in relation to a material sheet; and
a controller configured to selectively activate the electrical coils in a manner causing independent, coordinated movement of the movers over the stator surface, and causing the end effectors to engage with and operate on the material sheet.

2. The manufacturing system of claim 1, wherein:
the stator base is comprised of multiple tiles positioned in side-by-side relation to each other and collectively defining the planar stator surface, each tile containing an array of the electrical coils.

3. The manufacturing system of claim 1, wherein each mover is configured to move with at least 2 degrees-of-freedom, including:
planar motion parallel to the stator surface within the plane of a mover x-axis and a mover y-axis; and
rotational motion about a mover z-axis perpendicular to the stator surface.

4. The manufacturing system of claim 1, wherein:
at least one of the movers includes a telescopic post configured to extend and retract an end effector in a direction perpendicular to the stator surface.

5. The manufacturing system of claim 1, wherein at least one of the end effectors is couplable to one of the movers via at least one of the following:
a wrist joint;
a multi-axis robot.

6. The manufacturing system of claim 1, wherein one or more of the end effectors comprises at least one of the following:
a cutting device configured to cut the material sheet
a gripper configured to engage with and disengage from the material sheet to allow for pickup and placement of the material sheet;
a tacking device configured to spot fix the material sheet in position on a tooling surface or a previously applied material sheet; and
a compaction device configured to compact the material sheet against the tooling surface; and
an inspection device configured to actively monitor the pickup, placement, and forming of the material sheet on the tooling surface.

7. The manufacturing system of claim 1, wherein:
the controller is configured to cause the movers and end effectors to form the material sheet into a shape complementary to a tooling surface while supporting the material sheet in three-dimensional space, prior to applying the material sheet to the tooling surface.

8. A manufacturing system, comprising:
a base transport system;
a stator base, movably supported by the base transport system, and having a planar stator surface covering an array of electrical coils configured to generate an electromagnetic field;
a plurality of movers associated with the stator base, each mover containing multiple permanent magnets configured to cause levitated movement of the mover relative to the stator surface in response to the electromagnetic field;

a plurality of end effectors coupled to the movers, and configured to perform one or more functions in relation to a material sheet;

a controller configured to perform the following:
selectively activate the electrical coils in a manner causing independent, coordinated movement of the movers over the stator surface, and causing the end effectors to engage with the material sheet at a material pickup station; and cause the base transport system to move the stator base through an envelope of motion to thereby transport the material sheet from the material pickup station to a material placement station.

9. The manufacturing system of claim 8, wherein:
the base transport system comprises at least one of the following: a robotic device, a track system, an overhead gantry.

10. A method of processing a material sheet, comprising:
activating, using a controller, an array of electrical coils in a stator base having a planar stator surface covering the array of electrical coils, and the activation of the array of electrical coils thereby generating an electromagnetic field;

levitating and moving a plurality of movers in a coordinated manner over the stator surface in response to multiple permanent magnets in each mover reacting to the electromagnetic field;

performing one or more functions in relation to a material sheet using one or more end effectors coupled to the movers; and wherein the controller selectively activates the electrical coils in a manner causing independent, coordinated movement of the movers over the stator surface, and causing the end effectors to engage with and operate on the material sheet.

11. The method of claim 10, wherein activating the array of electrical coils in the stator base comprises:
activating an array of electrical coils in each of a plurality of tiles positioned in side-by-side relation to each other, and collectively defining the stator surface.

12. The method of claim 10, wherein moving the plurality of movers comprises moving at least one mover with at least 2 degrees-of-freedom, including:
translating the mover in a direction parallel to the stator surface within the plane of a mover x-axis and a mover y-axis; and
rotating the mover about a mover z-axis perpendicular to the stator surface.

13. The method of claim 10, further comprising:
extending and retracting at least one end effector in a direction perpendicular to the stator surface using a telescopic post coupling the end effector to one of the movers.

14. The method of claim 10, further comprising:
orienting at least one end effector using one of a wrist joint or a multi-axis robot coupling the end effector to one of the movers.

15. The method of claim 10, wherein performing one or more functions on the material sheet using one or more end effectors comprises at least one of the following:

cutting the material sheet using a cutting device;
engaging with and disengaging from the material sheet using a plurality of grippers;
spot fixing the material sheet in position on a tooling surface or a previously applied material sheet using a tacking device;
compacting the material sheet against the tooling surface using a compaction device;
monitoring the pickup, placement, and forming of the material sheet on the tooling surface using an inspection device.

16. The method of claim 15, wherein engaging with and disengaging from the material sheet using the plurality of grippers comprises:
engaging the plurality of grippers to a corresponding plurality of engagement points distributed throughout a material sheet in a planar configuration;
picking up the material sheet by adjusting the positions and/or orientations of the movers and/or the grippers;
placing the material sheet on a tooling surface that is non-planar, by re-adjusting the positions of the movers and/or the grippers; and
disengaging the plurality of grippers from the plurality of engagement points.

17. The method of claim 16, wherein placing the material sheet on the tooling surface comprises:
moving the movers and/or the grippers in a manner to form the material sheet over the tooling surface via the following:
initially placing a localized portion of the material sheet in contact with the tooling surface while remaining portions of the material sheet are separated from the tooling surface; and
applying tensile force to the material sheet at a plurality of the engagement points via a corresponding plurality of the grippers, while incrementally forming the remaining portions of the material sheet over the tooling surface.

18. The method of claim 16, further comprising:
positioning and orienting the movers and end effectors in a manner to form the material sheet into a shape complementary to a tooling surface while supporting the material sheet in three-dimensional space, prior to placing the material sheet on the tooling surface.

19. The method of claim 10, further comprising:
using a base transport system to move the stator base through an envelope of motion that enables the end effectors to pick up the material sheet from a material pickup station, and move the material sheet over to a material placement station containing a tooling surface.

20. The method of claim 19, wherein using the base transport system to move the stator base through an envelope of motion comprises one of:
moving the stator base through an envelope of motion using one of a robotic device, a track system, or an overhead gantry.

* * * * *